US012217736B2

(12) United States Patent
Sharifi et al.

(10) Patent No.: US 12,217,736 B2
(45) Date of Patent: *Feb. 4, 2025

(54) SIMULTANEOUS ACOUSTIC EVENT DETECTION ACROSS MULTIPLE ASSISTANT DEVICES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,859

(22) Filed: Sep. 13, 2023

(65) Prior Publication Data

US 2023/0419951 A1    Dec. 28, 2023

Related U.S. Application Data

(63) Continuation of application No. 17/085,926, filed on Oct. 30, 2020, now Pat. No. 11,798,530.

(51) Int. Cl.
*G10L 15/00* (2013.01)
*G01S 3/80* (2006.01)
(Continued)

(52) U.S. Cl.
CPC ............ *G10L 15/01* (2013.01); *G01S 3/8006* (2013.01); *G10L 15/08* (2013.01); *G10L 15/32* (2013.01);
(Continued)

(58) Field of Classification Search
CPC ......... G10L 15/01; G10L 15/08; G10L 15/32; G10L 2015/088; G10L 15/30;
(Continued)

(56) References Cited

U.S. PATENT DOCUMENTS 9,293,136 B2 *   3/2016   Aleksic ................... G10L 15/01
9,728,188 B1 *   8/2017   Rosen ..................... G10L 25/51
(Continued)

FOREIGN PATENT DOCUMENTS

CN        108351872        7/2018
CN        110364151       10/2019
(Continued)

OTHER PUBLICATIONS

European Patent Office; Communication pursuant to Article 94(3) issued in Application No. 20829156.7; 7 pages; dated Jun. 1, 2023.
(Continued)

*Primary Examiner* — Abdelali Serrou
(74) *Attorney, Agent, or Firm* — Gray Ice Higdon

(57) ABSTRACT

Implementations can detect respective audio data that captures an acoustic event at multiple assistant devices in an ecosystem that includes a plurality of assistant devices, process the respective audio data locally at each of the multiple assistant devices to generate respective measures that are associated with the acoustic event using respective event detection models, process the respective measures to determine whether the detected acoustic event is an actual acoustic event, and cause an action associated with the actional acoustic event to be performed in response to determining that the detected acoustic event is the actual acoustic event. In some implementations, the multiple assistant devices that detected the respective audio data are anticipated to detect the respective audio data that captures the actual acoustic event based on a plurality of historical acoustic events being detected at each of the multiple assistant devices.

18 Claims, 7 Drawing Sheets

(51) Int. Cl.
  *G10L 15/01* (2013.01)
  *G10L 15/08* (2006.01)
  *G10L 15/32* (2013.01)
  *H04R 29/00* (2006.01)

(52) U.S. Cl.
  CPC ...... *H04R 29/006* (2013.01); *G10L 2015/088* (2013.01)

(58) Field of Classification Search
  CPC ..... G10L 15/22; G01S 3/8006; H04R 29/006; G06F 3/167; G06F 16/3329; G06F 16/90332
  See application file for complete search history.

(56) References Cited

U.S. PATENT DOCUMENTS

| | | |
|---|---|---|
| 10,769,203 B1 | 9/2020 | Sonasath et al. |
| 11,195,522 B1* | 12/2021 | Makashir ............ G10L 15/1815 |
| 2016/0055850 A1 | 2/2016 | Nakadaï |
| 2016/0078286 A1 | 3/2016 | Tani |
| 2017/0004132 A1* | 1/2017 | Sharifi .................. G06F 16/955 |
| 2017/0025124 A1* | 1/2017 | Mixter .................... G10L 15/22 |
| 2017/0083285 A1 | 3/2017 | Meyers et al. |
| 2017/0186433 A1 | 6/2017 | Alvarez Guevara |
| 2018/0114538 A1 | 4/2018 | Kakadiaris |
| 2018/0158453 A1 | 6/2018 | Campbell |
| 2018/0330589 A1 | 11/2018 | Horling |
| 2018/0330735 A1 | 11/2018 | Strope |
| 2019/0103094 A1 | 4/2019 | Neil |
| 2019/0115026 A1* | 4/2019 | Sharifi .................... G10L 15/08 |
| 2019/0147873 A1 | 5/2019 | Voigt |
| 2019/0287528 A1 | 9/2019 | Hughes |
| 2019/0385594 A1 | 12/2019 | Park |
| 2020/0105256 A1 | 4/2020 | Fainberg et al. |
| 2020/0160867 A1 | 5/2020 | Roeck |
| 2022/0139371 A1 | 5/2022 | Sharifi et al. |

FOREIGN PATENT DOCUMENTS

| | | |
|---|---|---|
| CN | 110534102 | 12/2019 |
| CN | 110853620 | 2/2020 |
| EP | 3407348 | 11/2018 |
| EP | 3975171 | 3/2022 |
| JP | 2017072857 | 4/2017 |
| WO | 2014174738 | 10/2014 |

OTHER PUBLICATIONS

European Patent Office; International Search Report and Written Opinion of App. No. PCT/US2020/064988; 14 pages; dated Jul. 6, 2021.
Intellectual Property India; First Examination Report issued in Application No. 202227062653; 8 pages; dated Sep. 19, 2023.
Japanese Patent Office; Notice of Reasons of Rejection issued in Application No. 2022-569600; 10 pages; dated Jan. 15, 2024.
China National Intellectual Property Administration; Notification of First Office Action issued in Application No. 202080100908.3; 42 pages; dated May 24, 2024.
Intellectual Property India; Hearing Notice issued in Application No. 202227062653; 4 pages; dated Aug. 13, 2024.
China National Intellectual Property Administration; Notice of Grant issued in Application No. 202080100908.3; 6 pages; dated Sep. 30, 2024.

* cited by examiner

SIMULTANEOUS ACOUSTIC EVENT DETECTION ACROSS MULTIPLE ASSISTANT DEVICES

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), an audio recording of a spoken utterance of a user (or a text conversion thereof), and optionally data indicative of the user's identity (e.g., credentials). The cloud-based counterpart may perform various processing on the query to return result(s) to the automated assistant client, which may then provide corresponding output to the user.

Many users may engage automated assistants using multiple assistant devices. For example, some users may possess a coordinated "ecosystem" of assistant devices that can receive user input directed to the automated assistant and/or can be controlled by the automated assistant, such as one or more smart phones, one or more tablet computers, one or more vehicle computing systems, one or more wearable computing devices, one or more smart televisions, one or more interactive standalone speakers, and/or one or more IoT devices, among other assistant devices. A user may engage in human-to-computer dialog with an automated assistant using any of these assistant devices (assuming an automated assistant client is installed and the assistant device is capable of receiving input). In some cases these assistant devices may be scattered around the user's primary residence, secondary residence, workplace, and/or other structure. For example, mobile assistant devices such as smart phones, tablets, smart watches, etc., may be on the user's person and/or wherever the user last placed them. Other assistant devices, such as traditional desktop computers, smart televisions, interactive standalone speakers, and IoT devices may be more stationary but nonetheless may be located at various places (e.g., rooms) within the user's home or workplace.

Techniques exist to alert user(s) (e.g., a single user, multiple users in a family, co-workers, co-inhabitants, etc.) when an acoustic event is detected at a given assistant device in an ecosystem of assistant devices. However, such techniques may be conducive to detecting false positive events. In other words, the given assistant device may determine that an acoustic event has occurred when, in fact, the acoustic event did not actually occur. As a result, an automated assistant client of the given assistant device may cause one or more actions to be performed when the automated assistant client should not have performed any action.

SUMMARY

Implementations described herein relate to simultaneously detecting audio data that captures an acoustic event at multiple assistant devices in an ecosystem that includes a plurality of assistant devices. The respective audio data detected at each of the multiple assistant devices that captures the acoustic event can be processed, using event detection model(s), to generate respective measures associated with the acoustic event. Each of the respective measures can be processed to determine whether the acoustic event is an actual acoustic event. In response to determining that the acoustic event is the actual acoustic event, an action associated with the acoustic event can be performed. The respective audio data can be processed locally at the assistant devices using the event detection model(s), processed remotely at a remote system using the event detection model(s), and/or processed at a given assistant device in the ecosystem (e.g., that may or may not have detected audio data that captures the acoustic event) using the event detection model(s).

In some implementations, the acoustic event can correspond to a hotword event. In these implementations, the acoustic event detection model(s) can correspond to hotword detection model(s) that are trained to detect a particular word or phrase that, when detected, causes one or more components and/or functionalities of an automated assistant to be activated at one or more of the assistant devices in the ecosystem. For example, assume a given assistant device having microphone(s) is located in a primary dwelling of a user that is associated with the ecosystem. Further assume that the given assistant detects audio data, via the microphone(s), that captures an acoustic event, and further assume that the audio data is processed, using the hotword detection model(s), to generate a probability that is indicative of whether the audio data includes the particular word or phrase. Moreover, assume at least one additional assistant device having additional microphone(s) is locationally proximate in the ecosystem with the given assistant device. Further assume that the at least one additional assistant device detects additional audio data, via the additional microphone(s), that also captures the acoustic event, and further assume that the additional audio data is processed, using the hotword detection model(s), to generate an additional probability that is also indicative of whether the additional audio data includes the particular word or phrase. In this example, the probability and the additional probability can be processed to determine whether the acoustic event, in fact, corresponds to an occurrence of the particular word or phrase.

For instance, assume the probability is a value of 0.70 and the additional probability is a value of 0.65. In this instance, if both the probability and the additional probability satisfy a threshold (e.g., a value of 0.60), then the hotword event can be verified as an actual hotword event, and the one or more components and/or functionalities of an automated assistant can be activated even though neither probability is relatively high. Also, for instance, assume the probability is a value of 0.90 and the additional probability is a value of 0.55. In this instance, the additional probability may not satisfy the threshold, but the hotword event may still be verified as an actual hotword event, and the one or more components and/or functionalities of an automated assistant can be activated since the probability indicated is relatively high (and optionally because the additional probability is within a threshold range (e.g., within a value of 0.10) of the threshold).

In some additional or alternative implementations, the acoustic event can correspond to a sound event. In these implementations, the acoustic event detection model(s) can correspond to sound detection model(s) that are trained to detect one or more particular sounds that, when detected, cause a notification to be rendered visually and/or audibly at a client device of the user that is associated with the ecosystem. The particular sound may include, for example, glass breaking, a dog barking, a cat meowing, a doorbell ringing, a smoke alarm sounding, a carbon monoxide detector sounding, a baby crying, knocking on a door, and/or any other sounds that may occur in the ecosystem. In some versions of those implementations, multiple sound detection models can be trained to detect respective particular sounds, whereas in other implementations a single sound detection model can be trained to detect multiple sounds. The audio data can be processed in the same or similar manner described above with respect to the hotword event, but additionally or alternatively include processing the audio data using the sound detection model(s) to verify whether the sound event is an actual sound event.

In various implementations, the at least one additional assistant device in the ecosystem can be identified in response to the given assistant device detecting the audio data that captures the acoustic event. If the acoustic event detected at the given assistant device is in fact an actual acoustic event, then the at least one additional assistant device that is identified in the ecosystem should have detected temporally corresponding audio data that also captures the acoustic event. The audio data captured by the assistant devices can be considered temporally corresponding audio data based on, for example, respective timestamps associated with the audio data captured at the assistant devices. For instance, the audio data can be considered temporally corresponding audio data when the timestamps match or are within a threshold duration of time of each other (e.g., within several milliseconds, several seconds, or any other suitable duration of time). In some versions of those implementations, the at least one additional assistant device can be identified based on, for example, the given assistant device and the at least one additional assistant device historically detecting audio data that captures the same acoustic event. In some additional or alternative versions of those implementations, the at least one additional assistant device can be identified based on, for example, the given assistant device and the at least one additional assistant device belonging to a same group of assistant devices in a device topology representation of the ecosystem.

By using the techniques described herein to detect and verify the occurrence of acoustic events using multiple assistant devices in the ecosystem, a quantity of false positives of acoustic events can be reduced. As a result, both computational and network resources can be conserved. For example, by using the techniques described herein in detecting and verifying the occurrence of hotword events in the ecosystem, components and/or functionalities of an automated assistant may be kept dormant when, absent these techniques, may have been activated even though they were not intended to be activated. As another example, by using the techniques described herein in detecting and verifying the occurrence of particular sounds in the ecosystem, notifications presented to a user associated with the ecosystem can be withheld when, absent these techniques, may have been presented even though the acoustic event did not in fact occur. Moreover, by using the techniques described herein to anticipate which assistant devices in the ecosystem should detect temporally corresponding audio data that captures the acoustic events, a quantity of the assistant devices that process the audio data can be reduced. Also as a result, both computational and network resources can be conserved. For example, by using the techniques described herein in anticipating the assistant devices in the ecosystem that should have detected the acoustic event, other assistant devices that may have captured temporally corresponding audio data that likely does not correspond to the acoustic event may not be considered in determining whether the acoustic event is the actual acoustic event.

The above description is provided as an overview of only some implementations of the present disclosure. Further description of those implementations, and other implementations, are described in more detail herein. As one non-limiting example, various implementations are described in more detail in the claims included herein.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
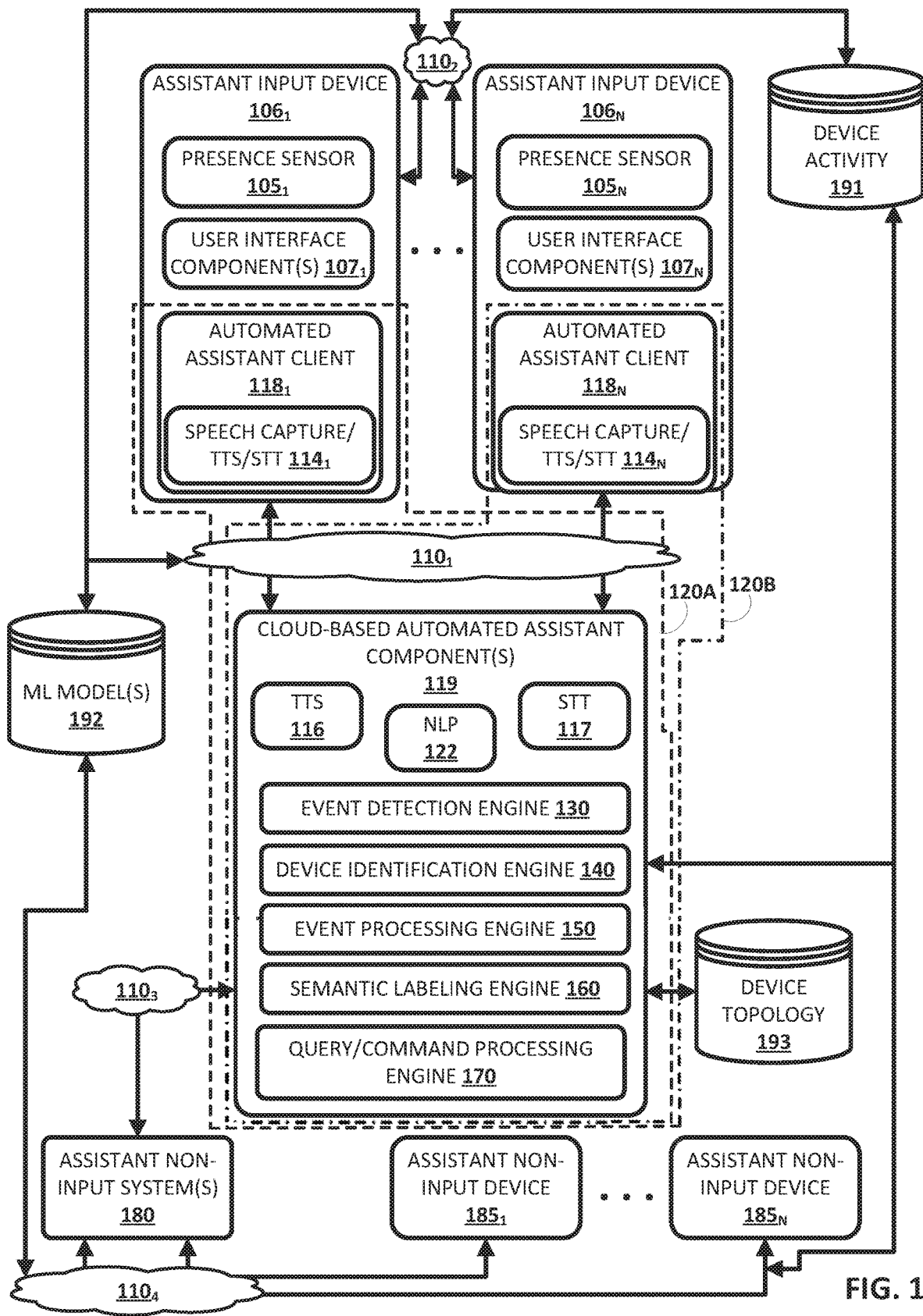
FIG. 1 is a block diagram of an example environment in which implementations disclosed herein may be implemented.

There is a proliferation of smart, multi-sensing network connected devices (also referred to herein as assistant devices) such smart phones, tablet computers, vehicle computing systems, wearable computing devices, smart televisions, interactive standalone speakers (e.g., with or without a display), sound speakers, home alarms, door locks, cameras, lighting systems, treadmills, thermostats, weight scales, smart beds, irrigation systems, garage door openers, appliances, baby monitors, fire alarms, moisture detectors, etc. Often, multiple assistant devices are located within the confines of a structure, such as a home—or located within multiple related structures, such as a user's primary residence and the user's secondary residence, the user's vehicle, and/or the user's work location.

Further, there is a proliferation of assistant devices that each include an automated assistant client that can form a logical instance of an automated assistant (also referred to herein as assistant input devices). These assistant input devices can be devoted solely to assistant functionality (e.g., an interactive standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some IoT devices can also be assistant input devices. For example, some IoT devices can include an automated assistant client and at least speaker(s) and/or microphone(s) that serve (at least in part) as user interface output and/or input devices for an assistant interface of the automated assistant client. Although some assistant devices may not implement the automated assistant client or have means for interfacing with a user (e.g., speaker(s) and/or microphone(s)), they may still be controlled by the automated assistant (also referred to herein as assistant non-input devices). For example, a smart light bulb may not include an automated assistant client, speaker(s), and/or microphone(s), but commands and/or requests can be transmitted to the smart light bulb, via the automated assistant, to control functionality of the smart light (e.g., turn on/off, dim, change colors, etc.).

Various techniques have been proposed for adding assistant devices (including both assistant input devices and assistant non-input devices) to an ecosystem of assistant devices and/or grouping the assistant devices within the ecosystem. For example, upon adding a new assistant device to the ecosystem, a user associated with the ecosystem can, in a device topology representation of the ecosystem, manually add the new assistant device to a group of assistant devices in the ecosystem via a software application (e.g., via an automated assistant application, a software application associated with the ecosystem, a software application associated with the new assistant device, or the like). Further, if the assistant device is moved within the ecosystem, the user may manually change the group to which the assistant device is assigned via the software application. Otherwise, the group to which the assistant device is assigned may not accurately reflect a location of the assistant device within the ecosystem. For example, if a smart speaker labeled "living room speaker" is located in a living room of a primary house of a user and associated with a "living room" group of assistant devices, but the smart speaker is moved to a kitchen of the primary house of the user, then the smart speaker may still be labeled "living room speaker" and included in the "living room" group of assistant devices, even though the label and group are not representative of the location of the assistant device, unless the user manually changes the label and group in a device topology representation for the ecosystem of the primary house of the user.

The device topology representation can include labels (or unique identifiers) that are associated with the respective assistant devices. Further, the device topology representation can specify labels (or unique identifiers) associated with the respective assistant devices. The device attributes for a given assistant device can indicate, for example, one or more input and/or output modalities supported by the respective assistant devices. For instance, a device attribute for a standalone speaker-only assistant client device can indicate that it is capable of providing audible output, but incapable of providing visual output. The device attributes for a given assistant device can additionally or alternatively, for example, identify one or more states, of the given assistant device, that can be controlled; identify a party (e.g., a first-party (1P) or third-party (3P)) that manufactures, distributes, and/or creates the firmware for the assistant device; and/or identify a unique identifier for the given assistant device, such as a 1P or 3P provided fixed identifier or a label assigned to the given assistant device by a user. According to various implementations disclosed herein, the device topology representation can optionally further specify: which smart devices can be controlled locally by which assistant devices; local addresses for locally controllable assistant devices (or local addresses for hubs that can directly locally control those assistant devices); local signal strengths and/or other preference indicators amongst the respective assistant devices. Further, according to various implementations disclosed herein, the device topology representation (or a variation thereof) can be locally stored at each of a plurality of assistant devices for utilization in locally controlling and/or locally assigning labels to assistant devices. Moreover, the device topology representation can specify groups associated with the respective assistant devices that can be defined with various levels of granularity. For instance, multiple smart lights in a living room of a primary house of a user can be considered to belong to a "living room lights" group. Further, if the living room of the primary house also includes a smart speaker, all of the assistant devices located in the living room can be considered to belong to a "living room assistant devices" group.

The automated assistant can detect various events that occur in the ecosystem based on one or more signals generated by one or more of the assistant devices. For example, the automated assistant can process, using an event detection model(s) or rule(s), one or more of the signals to detect these events. Further, the automated assistant can cause one or more actions to be performed based on the output generated based on one or more of the signals for the events that occur in the ecosystem. In some implementations, the event detected may be an acoustic event captured via respective microphone(s) of one or more assistant devices. The automated assistant can cause audio data that captures the acoustic event to be processed using acoustic event model(s). The acoustic event detected by the acoustic event model(s) can include, for example, detecting a hotword that invokes an automated assistant included in a spoken utterance using hotword detection model(s), detecting ambient noise in the ecosystem (and optionally while speech reception is active at a given one of the assistant devices) in the ecosystem using ambient noise detection model(s), detecting a particular sound (e.g., glass breaking, a dog barking, a cat meowing, a doorbell ringing, a smoke alarm sounding, a carbon monoxide detector sounding, a baby crying, knocking on a door, and/or other acoustic events) in the ecosystem using sound detection model(s), and/or other acoustic-related events that can be detected using respective acoustic event detection model(s). For example, assume audio data is detected via respective microphone(s) of at least one of the assistant devices. In this example, the automated assistant can cause the audio data to be processed by the hotword detection model(s) of the at least one of the assistant device(s) to determine whether the audio data captures a hotword to invoke the automated assistant. Further, the automated assistant can additionally or alternatively cause the audio data to be processed by the ambient noise detection model(s) of the at least one of the assistant device(s) to classify any ambient (or background) noise captured in the audio data into one or more disparate semantic categories of ambient noise (e.g., movie or television sounds, cooking sounds, and/or other disparate categories of sounds). Moreover, the automated assistant can additionally or alternatively cause the audio data to be processed by the sound detection model(s) of the at least one of the assistant device(s) to determine whether any particular sounds are captured in the audio data.

Implementations described herein relate to determining an acoustic event actually occurred in the ecosystem based on temporally corresponding audio data captured by respective microphone(s) of multiple assistant devices. Those implementations further relate to processing the audio data locally at the assistant devices to generate measures that are indicative of whether the acoustic event actually occurred. Yet further, those implementations relate to identifying which assistant devices in the ecosystem should have detected audio data that temporally corresponds to audio data based on a device topology representation for the ecosystem, and when the multiple assistant devices detect temporally corresponding audio data, causing the temporally corresponding audio data to be processed by the respective event detection model(s).

Now turning to FIG. 1, an example environment in which techniques disclosed herein may be implemented is illustrated. The example environment includes a plurality of assistant input devices $106_{1-N}$ (also referred to herein simply as "assistant input devices 106"), one or more cloud-based automated assistant components 119, one or more assistant non-input systems 180, one or more assistant non-input devices $185_{1-N}$ (also referred to herein simply as "assistant non-input devices 185"), a device activity database 191, a machine learning ("ML") model(s) database, and a device topology database 193. The assistant input devices 106 and the assistant non-input device 185 of FIG. 1 may also be referred to collectively herein as "assistant devices".

One or more (e.g., all) of the assistant input devices 106 can execute a respective instance of a respective automated assistant client $118_{1-N}$. However, in some implementations one or more of the assistant input devices 106 can optionally lack an instance of the respective automated assistant client $118_{1-N}$, and still include engine(s) and hardware components for receiving and processing user input directed to an automated assistant (e.g., microphone(s), speaker(s), speech recognition engine(s), natural language processing engine(s), speech synthesis engine(s), and so on). An instance of the automated assistant client $118_{1-N}$ can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client $118_{1-N}$ can optionally interact with one or more cloud-based automated assistant components 119 in responding to various requests provided by respective user interface components $107_{1-N}$ of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.) and/or wide area networks ("WANs,", including the Internet, etc.). The communicative coupling of the cloud-based automated assistant components 119 with the assistant input devices 106 is indicated generally by 110₁ of FIG. 1. Also, in some embodiments, the assistant input devices 106 may be communicatively coupled with each other via one or more networks (e.g., LANs and/or WANs), indicated generally by $110_2$ of FIG. 1.

The one or more cloud-based automated assistant components 119 can also be communicatively coupled with the one or more assistant non-input systems 180 via one or more networks (e.g., LANs and/or WANs). The communicative coupling of the cloud-based automated assistant components 119 with the assistant non-input system(s) 180 is indicated generally by $110_3$ of FIG. 1. Further, assistant non-input system(s) 180 can each be communicatively coupled to one or more (e.g., groups) of the assistant non-input devices 185 via one or more networks (e.g., LANs and/or WANs). For example, a first assistant non-input system 180 can be communicatively coupled with, and receive data from, a first group of one or more of the assistant non-input devices 185, a second assistant non-input system 180 can be communicatively coupled with, and receive data from, a second group of one or more of the assistant non-input devices 185, and so on. The communicative coupling of the assistant non-input system(s) 180 with the assistant non-input devices 185 is indicated generally by $110_4$ of FIG. 1.

An instance of an automated assistant client 118, by way of its interactions with one or more of the cloud-based automated assistant components 119, may form what appears to be, from a user's perspective, a logical instance of an automated assistant 120 with which the user may engage in a human-to-computer dialog. Two instances of such an automated assistant 120 are depicted in FIG. 1. A first automated assistant 120A encompassed by a dashed line includes automated assistant client $118_1$ of assistant input device $106_1$ and one or more cloud-based automated assistant components 119. A second automated assistant 120B encompassed by a dash-dash-dot line includes automated assistant client $118_N$ of assistant input device $106_N$ and one or more cloud-based automated assistant components 119. It thus should be understood that each user that engages with an automated assistant client 118 executing on one or more of the assistant input devices 106 may, in effect, engage with his or her own logical instance of an automated assistant 120 (or a logical instance of automated assistant 120 that is shared amongst a household or other group of users). For the sake of brevity and simplicity, the term "automated assistant" as used herein will refer to the combination of an automated assistant client 118 executing on a respective one of the assistant input devices 106 and one or more of the cloud-based automated assistant components 119 (which may be shared amongst multiple automated assistant clients 118). Although only a plurality of assistant input devices 106 are illustrated in FIG. 1, it is understood that cloud-based automated assistant component(s) 119 can additionally serve many additional groups of assistant input devices.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television, a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative assistant input devices may be provided. The assistant non-input devices 185 may include many of the same devices as the assistant input devices 106, but are not capable of receiving user input directed to automated assistant 120 (e.g., do not include user interface input component(s)). Although the assistant non-input devices 185 do not receive user input directed to the automated assistant 120, the assistant non-input devices 185 may still be controlled by the automated assistant 120.

In some implementations, the plurality of assistant input devices 106 and assistant non-input devices 185 can be associated with each other in various ways in order to facilitate performance of techniques described herein. For example, in some implementations, the plurality of assistant input devices 106 and assistant non-input devices 185 may be associated with each other by virtue of being communicatively coupled via one or more networks (e.g., via the network(s) 110 of FIG. 1). This may be the case, for instance, where the plurality of assistant input devices 106 and assistant non-input devices 185 are deployed across a particular area or environment, such as a home, a building, and so forth. Additionally or alternatively, in some implementations, the plurality of assistant input devices 106 and assistant non-input devices 185 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 and assistant non-input devices 185 can be manually and/or automatically associated with each other in a device topology representation of the ecosystem that is stored in the device topology database 193.

The assistant non-input system(s) 180 can include one or more first-party (1P) systems and/or one or more third-party (3P) systems. A 1P system references a system that is controlled by a party that is the same as the party that controls the automated assistant 120 being referenced herein. A 3P system, as used herein, references a system that is controlled by a party that is distinct from the party that controls the automated assistant 120 being referenced herein.

The assistant non-input system(s) 180 can receive data from the assistant non-input devices 185 and/or the one or more cloud-based automated assistant components 119 that are communicatively coupled thereto (e.g., via the networks 110 of FIG. 1), and selectively transmit data (e.g., state(s), state change(s), and/or other data) to the assistant non-input devices 185 and/or the one or more cloud-based automated assistant components 119. For example, assume assistant non-input device 185₁ is a smart doorbell IoT device. In response to an individual pressing a button on the doorbell IoT device, the doorbell IoT device can transmit corresponding data to one of the assistant non-input system(s) 180 (e.g., one of the assistant non-input system(s) managed by a manufacturer of the doorbell that may be a 1P system or 3P system). The one of the assistant non-input system(s) 180 can determine a change in a state of the doorbell IoT device based on such data. For instance, the one of the assistant non-input system(s) 180 can determine a change in the doorbell from an inactive state (e.g., no recent pressing of the button) to an active state (recent pressing of the button), and the change in the doorbell state can be transmitted to the one or more cloud-based automated assistant components 119 and/or one or more of the assistant input devices 106 (e.g., via the networks 110 of FIG. 1). Notably, although user input is received at the assistant non-input device 185₁ (e.g., the pressing of the button on the doorbell), the user input is not directed to the automated assistant 120 (hence the term "assistant non-input device"). As another example, assume assistant non-input device 185₁ is a smart thermostat IoT device that has microphone(s), but the smart thermostat does not include the automated assistant client 118. An individual can interact with the smart thermostat (e.g., using touch input or spoken input) to change a temperature, set particular values as setpoints for controlling an HVAC system via the smart thermostat, and so on. However, the individual cannot communicate directly with the automated assistant 120 via the smart thermostat, unless the smart thermostat includes the automated assistant client 118.

In various implementations, the one or more cloud-based automated assistant components 119 may further include various engines. For example, as shown in FIG. 1, the one or more cloud-based automated assistant components 119 may further include an event detection engine 130, a device identification engine 140, an event processing engine 150, a semantic labeling engine 160, and a query/command processing engine 170. Although these various engines are depicted as the one or more cloud-based automated assistant components 119 in FIG. 1, it should be understood that is for the sake of example and is not meant to be limiting. For example, the assistant input devices 106 and/or the assistant non-input devices 185 may include one or more of these various engines. As another example, these various engines can be distributed across the assistant input devices 106, the assistant non-input devices 185 may include one or more of these various engines, and/or, the one or more cloud-based automated assistant components 119.

In some implementations, the event detection engine 130 can detect various events that occur in the ecosystem. In some versions of those implementations, the event detection engine 130 can determine when a given one of the assistant input devices 106 and/or a given one of the assistant non-input devices 185 (e.g., a given one of the assistant devices) is newly added to the ecosystem or moved locations within the ecosystem. For example, the event detection engine 130 can determine when a given one of the assistant devices is newly added to the ecosystem based on one or more wireless signals detected over the network(s) 110 and via the device identification engine 140. For instance, when the given one of the assistant devices is newly connected to one or more of the networks 110, the given one of the assistant devices can broadcast a signal that indicates it is newly added to the network 110. As another example, the event detection engine 130 can determine when a given one of the assistant devices has moved locations within the ecosystem based on one or more wireless signals detected over the network(s) 110. In these examples, the device identification engine 140 can process the signals to determine that the given one of the assistant devices is newly added to the network 110 and/or to determine that the given one of the assistant devices has moved locations within the ecosystem. The one or more wireless signals detected by the device identification engine 140 can be, for example, a network signal and/or an acoustic signal that is human-imperceptive and that optionally includes respective unique identifiers for the given one of the assistant devices and/or other assistant devices that are locationally proximate to the given one of the assistant devices. For instance, when the given one of the assistant devices is moved locations within the ecosystem, the device identification engine 140 can detect one or more wireless signals being transmitted by other assistant devices that are locationally proximate to the given one of the assistant devices. These signals can be processed to determine one or more other assistant devices that are locationally proximate to the given one of the assistant devices differ from one or more assistant devices that were previously locationally proximate to the given one of the assistant devices.

In some further versions of those implementations, the automated assistant 120 can cause the given one of the assistant devices that is newly added to the ecosystem or moved locations within the ecosystem to be assigned to a group of assistant devices (e.g., in the device topology representation of the ecosystem stored in the device topology database 193). For example, in implementations where the given one of the assistant devices is newly added to the ecosystem, the given one of the assistant devices can be added to an existing group of assistant devices or a new group of assistant devices that includes the given one of the assistant devices can be created. For instance, if the given one of the assistant devices is locationally proximate to a plurality of assistant devices belonging to a "kitchen" group (e.g., a smart oven, a smart coffee maker, an interactive standalone speaker associated with a unique identifier or label that indicates it is located in the kitchen, and/or other assistant devices), then the given one of the assistant devices can be added to the "kitchen" group, or a new group can be created. As another example, in implementations where the given one of the assistant devices is moved locations within the ecosystem, the given one of the assistant devices can be added to an existing group of assistant devices, or a new group of assistant devices that includes the given one of the assistant devices can be created. For instance, if the given one of the assistant devices was locationally proximate to a plurality of assistant devices belonging to the aforementioned "kitchen" group, but is now locationally proximate to a plurality of assistant devices belonging to a "garage" group (e.g., a smart garage door, a smart door lock, and/or other assistant devices), then the given one of the assistant devices can be removed from the "kitchen" group and added to the "garage" group.

In some additional or alternative versions of those implementations, the event detection engine 130 can detect occurrences of acoustic events. The occurrences of the acoustic event can be detected based on audio data that is received at one or more of the assistant input devices 106 and/or one or more of the assistant non-input devices 185 (e.g., one or more of the assistant devices). The audio data that is received at the one or more of the assistant devices can be processed by event detection model(s) stored in the ML model(s) database 192. In these implementations, each of the one or more assistant devices that detect occurrences of the acoustic events include respective microphone(s).

In some further versions of those implementations, the occurrences of the acoustic event can include ambient noise captured in audio data at one or more of the assistant devices (and optionally only include occurrences of ambient noise that are detected when speech reception is active at the one or more of the assistant devices). The ambient noise detected at each of the one or more assistant devices can be stored in the device activity database 191. In these implementations, the event processing engine 150 can process the ambient noise detected at the one or more assistant devices using ambient noise detection model(s) trained to classify the ambient noise into one or more of a plurality of disparate semantic categories based on measure(s) generated in processing the ambient noise using the ambient noise detection model(s). The plurality of disparate categories can include, for example, a movie or television sounds category, a cooking sounds category, a music sounds category, a garage or workshop sounds category, a patio sounds category, and/or other disparate categories of sounds that are semantically meaningful. For instance, if the event processing engine 150 determines that ambient noise processed using the ambient noise detection model(s) includes sounds that correspond to a microwave sounding, food sizzling on a skillet, a food processor processing food, etc., then the event processing engine 150 can classify the ambient noise into a cooking sounds category. As another example, if the event processing engine 150 determines that ambient noise processed using the ambient noise detection model(s) includes sounds that correspond to a saw buzzing, a hammer hammering, etc., then the event processing engine 150 can classify the ambient noise into a garage or workshop category. The classification of the ambient noise detected at particular devices may also be utilized as device-specific signals that are utilized in inferring semantic labels for the assistant devices (e.g., described with respect to the semantic labeling engine 160).

In some additional or alternative versions of those further implementations, the occurrences of the acoustic event can include a hotword or particular sound detected at one or more of the assistant devices. In these implementations, the event processing engine 150 can process the audio data detected at the one or more assistant devices using hotword detection model(s) trained to determine whether the audio data includes a particular word or phrase that invokes the automated assistant 120 based on measure(s) generated in processing the audio data using the hotword detection model(s). For example, the event processing engine 150 can process the audio data to determine whether the audio data captures a spoken utterance of a user that includes "Assistant", "Hey assistant", "Okay, assistant", and/or any other word or phrase that invokes the automated assistant. Further, the measure(s) generated using the hotword detection model(s) can include a respective confidence level or probability that is indicative of whether or not the audio data includes a term or phrase that invokes the automated assistant 120. In some versions of these implementations, the event processing engine 150 can determine that the audio data captures the term or phrase if the measure(s) satisfy a threshold. For instance, if the event processing engine 150 generates a measure of 0.70 that is associated with the audio data capturing a term or phrase that invokes the automated assistant 120 and the threshold is 0.65, then the event processing engine 150 may determine that audio data captures the term or phrase that invokes the automated assistant 120. The hotword detection model(s) can be trained using, for example, supervised learning techniques. For example, a plurality of training instances can be obtained. Each of the training instances can include training instance input that includes audio data (or features of the audio data, such as mel-Cepstral frequency coefficients, an audio waveform, mel-bank features, and/or other acoustic features), and corresponding training instance output that includes an indication of whether the training instance input includes a particular word or phrase that invokes the automated assistant 120. For instance, if the training instance input includes audio data that captures the particular word or phrase, the corresponding training instance output can be assigned a label (e.g., "Yes") or value (e.g., "1") that indicates the training instance input includes the particular word or phrase, and if the training instance input does not include the particular word or phrase, the corresponding training instance output can be assigned a different label (e.g., "No") or value (e.g., "0").

In these implementations, the event processing engine 150 can additionally or alternatively process the audio data detected at the one or more assistant devices using sound detection model(s) trained to determine whether the audio data includes a particular sound based on measure(s) generated in processing the audio data using the sound detection model(s). The particular sounds can include, for example, glass breaking, a dog barking, a cat meowing, a doorbell ringing, a smoke alarm sounding, a carbon monoxide detector sounding, a baby crying, or knocking on a door. For example, the event processing engine 150 can process the audio data to determine whether the audio data captures any of these particular sounds. In this example, a single sound detection model can be trained to determine whether multiple of the particular sounds are captured in the audio data, or multiple sounds detection models can be trained to determine whether a given particular sound is captured in the audio data. Further, the measure(s) generated using the sound detection model(s) can include a respective confidence level or probability that is indicative of whether or not the audio data includes the particular sound. In some versions of these implementations, the event processing engine 150 can determine that the audio data captures the particular sound if the measure(s) satisfy a threshold. For instance, if the event processing engine 150 generates a measure of 0.70 that is associated with the audio data capturing a sound of glass breaking and the threshold is 0.65, then the event processing engine 150 may determine that audio data captures the sound of glass breaking.

In various implementations, the occurrence of the acoustic event may be captured by multiple assistant devices in the ecosystem. For instance, multiple assistant devices in the environment may capture temporally corresponding audio data (e.g., temporally corresponding in that respective audio data is detected at the multiple assistant devices at the same time or within a threshold duration of time). In these implementations, and in response to a given assistant device detecting audio data in the ecosystem, the device identification engine 140 can identify one or more additional assistant devices that should also have detected temporally corresponding audio data that also captures the acoustic event. For example, the device identification engine 140 can identify one or more of the additional assistant devices that should also have detected temporally corresponding audio data that also captures the acoustic event based on the one or more additional assistant devices historically detecting temporally corresponding audio data that also captures the acoustic event. In other words, the device identification engine 140 can anticipate that the one or more additional assistant devices should also capture audio data that includes the acoustic events because the given assistant device and the one or more additional assistant devices have historically captured temporally corresponding audio data that includes the same acoustic event (e.g., as described with respect to FIGS. 2A, 2B, and 3).

In various implementations, one or more device-specific signals generated or detected by the respective assistant devices can be stored in device activity database 191. In some implementations, the device activity database 191 can correspond to a portion of memory dedicated to the device activity of that specific assistant device. In some additional or alternative implementations, the device activity database 191 can correspond to memory of a remote system in communication with the assistant devices (e.g., via the networks 110 of FIG. 1). This device activity can be utilized in generating candidate semantic labels for a given one of the assistant devices (e.g., described with respect to the semantic labelling engine 160). The device activity can include, for example, queries or requests received at the respective assistant devices (and/or a semantic category associated with each of the plurality of queries or requests), commands executed at the respective assistant devices (and/or a semantic category associated with each of the plurality of commands), ambient noise detected at the respective assistant devices (and/or a semantic category associated with various instances of the ambient noise), unique identifiers or labels of any assistant devices that are locationally proximate to a given assistant device (e.g., identified via the event detection engine 140), and/or any other data that is received, generated, and/or executed by the respective assistant devices.

In some implementations, the semantic labeling engine 160 can process one or more device-specific signals to generate candidate semantic labels for a given one of the assistant devices (e.g., a given one the assistant input devices 106 and/or a given one of the assistant non-input devices 185) based on the one or more device-specific signals. The candidate semantic labels can be generated using one or more rule(s) (that are optionally heuristically defined) or machine learning model(s) (e.g., stored in the ML model(s) database 192). For example, one or more heuristically defined rules may indicate that a candidate semantic label associated with each of the semantic categories, into which the one or more device-specific signals, should be generated. For instance, assume the device-specific signals are classified into a "kitchen" category, a "cooking" category, a "bedroom" category, and a "living room" category. In this example, the candidate semantic labels can include a first candidate semantic label of "kitchen assistant device", a second candidate semantic label of "cooking assistant device", a third candidate semantic label of "bedroom assistant device", and a fourth semantic label of "living room assistant device". As another example, the one or more device-specific signals (or the one or more semantic categories corresponding thereto) can be processed using a machine learning model that is trained to generate the candidate semantic labels. For instance, the machine learning model can be trained based on a plurality of training instances. Each of the training instances can include training instance input and corresponding training instance output. The training instance input can include, for example, one or more device-specific signals and/or one or more semantic categories, and the corresponding training instance output can include, for example, ground truth output corresponding to the semantic labels that should be assigned based on the training instance input.

In some versions of those implementations, the given assistant device, for which the candidate semantic labels are generated, can be identified in response to determining that the given assistant device is newly added to the ecosystem and/or moved locations within the ecosystem. In some additional or alternative versions of those implementations, the given assistant device, for which the candidate semantic labels are generated, can be identified periodically (e.g., once a month, once every six months, once a year and so on). In some additional or alternative versions of those implementations, the given assistant device, for which the candidate semantic labels are generated, can be identified in response to determining that the portion of the ecosystem in which the given assistant device is located has been repurposed (e.g., a room in a primary dwelling of ecosystem has been repurposed from a den to a bedroom). In these implementations, the given assistant device can be identified utilizing the event detection engine 130. Identifying the given assistant device in these and other manners are described with respect to FIGS. 2A and 2B.

In some implementations, the semantic labeling engine 160 can select a given semantic label, from among the candidate semantic labels, for a given assistant device based on one or more of the device-specific signals. In implementations where the candidate semantic labels for the given assistant device are generated based on the queries, requests, and/or commands stored in the device activity database 191 (or text corresponding thereto), the queries, requests, and/or commands can be processed using a semantic classifier (e.g., stored in ML model(s) database 192) to index the device activity, for the given assistant device, into one or more different semantic categories that correspond to disparate types of queries, requests, and/or commands. The candidate semantic labels can be generated based on the semantic categories into which the queries, commands, and/or requests are classified into, and the given semantic label that is selected for the given assistant device can be selected based on a quantity of the plurality of queries, request, and/or commands that are classified in a given semantic category. For example, assume that the given assistant device has previously received nine queries related to obtaining cooking recipes and two commands related to controlling smart lights in the ecosystem. In this example, the candidate semantic labels can include, for example, a first semantic label of "kitchen device" and a second semantic label of "control smart lights device". Further, the semantic labeling engine 160 can select the first semantic label of "kitchen device" as the given semantic label for the given assistant device since the historical usage of the given assistant device indicates that it is primarily used for cooking-related activities.

In some implementations, the semantic classifier(s) stored in the ML model(s) database 192 can be natural language understanding engine(s) (e.g., implemented by the NLP module 122 described below). Intent(s) that are determined based on processing the queries, commands, and/or requests that were previously received at the assistant devices can be mapped to one or more of the semantic categories. Notably, the plurality of disparate semantic categories described herein can be defined with various levels of granularity. For example, a the semantic categories can be associated with a genus category of smart device commands and/or for species category(ies) of that genus class, such as a category of smart lighting commands, a category of smart thermostat commands, and/or a category of smart camera commands. Put another way, each category can have a unique set of intent(s) associated therewith that are determined by the semantic classifier(s), although some intent(s) of a category may also be associated with additional category(ies). In some additional or alternative implementations, the semantic classifier(s) stored in the ML model(s) database 192 can be utilized to generate a text embedding (e.g., a lower-dimensional representation, such as a word2vec representation) corresponding to text of the queries, commands, and/or requests. These embeddings can be points within an embedding space where words or phrases that are semantically similar are associated with the same or similar portions of the embedding space. Further, these portions of the embedding space can be associated with one or more of the plurality of disparate semantic categories, and a given one of the embeddings can be classified into a given one of the semantic categories if a distance metric between the given one of the embeddings and one or more of the portions of the embedding space satisfy(ies) a distance threshold. For instance, cooking-related words or phrases can be associated with a first portion of the embedding space that is associated with a "cooking" semantic label, weather-related words or phrases can be associated with a second portion of the embedding space that is associated with a "weather" semantic label, and so on.

In implementations where the one or more device-specific signals additionally or alternatively include the ambient noise activity, instances of the ambient noise can be processed using ambient noise detection model(s) (e.g., stored in ML model(s) database 192) to index the device activity, for the given assistant device, into one or more different semantic categories that correspond to disparate types of ambient noise. The candidate semantic labels can be generated based on the semantic categories into which the instances of the ambient noise are classified into, and the given semantic label that is selected for the given assistant device can be selected based on a quantity of the instances of ambient that are classified in a given semantic category. For instance, assume that ambient noise detected at the given assistant device (and optionally only when speech recognition is active) primarily includes ambient noise that is classified as cooking sounds. In this example, the semantic labeling engine 160 can select the semantic label of "kitchen device" as the given semantic label for the given assistant device since the ambient noise captured in audio data indicates the device is located proximate to cooking-related activities.

In some implementations, the ambient noise detection model(s) stored in the ML model(s) database 192 can be trained to detect a particular sound, and it can be determined whether an instance of ambient noise includes the particular sound based on output(s) generated across the ambient noise detection model(s). The ambient noise detection model(s) can be trained using, for example, supervised learning techniques. For example, a plurality of training instances can be obtained. Each of the training instances can include training instance input that includes ambient noise, and corresponding training instance output that includes an indication of whether the training instance input includes the particular sound(s) for which the ambient noise detection model(s) is being trained to detect. For instance, if the ambient noise detection model(s) is being trained to detect the sound of glass breaking, training instances that include the sound of glass breaking can be assigned a label (e.g., "Yes") or value (e.g., "1") and training instances that do not include the sound of glass breaking can be assigned a different label (e.g., "No") or value (e.g., "0"). In some additional or alternative implementations, the ambient noise detection model(s) stored in the ML model(s) database 192 can be utilized to generate an audio embedding (e.g., a lower-dimensional representation of the instances of the ambient noise) based on the instances of the ambient noise (or acoustic features thereof, such as mel-Cepstral frequency coefficients, raw audio waveforms, and/or other acoustic features). These embeddings can be points within an embedding space where similar sounds (or acoustic features that capture the sounds) are associated with the same or similar portions of the embedding space. Further, these portions of the embedding space can be associated with one or more of the plurality of disparate semantic categories, and a given one of the embeddings can be classified into a given one of the semantic categories if a distance metric between the given one of the embeddings and one or more of the portions of the embedding space satisfy(ies) a distance threshold. For instance, instances of glass breaking can be associated with a first portion of the embedding space that is associated with a "glass breaking" sound, instances of a doorbell ringing can be associated with a second portion of the embedding space that is associated with a "doorbell" sound, and so on.

In implementations where the one or more device-specific signals additionally or alternatively include the unique identifiers or labels of additional assistant device(s) that are locationally proximate to the given assistant device, the candidate semantic labels can be generated based on those unique identifiers or labels, and the given semantic label that is selected for the given assistant device can be selected based on one or more of the unique identifiers or labels of the additional assistant device(s). For instance, assume that a first label of "smart oven" is associated with a first assistant device that is locationally proximate to the given assistant device and a second label of "smart coffee maker" is associated with a second assistant device that is locationally proximate to the given assistant device. In this example, the semantic labeling engine 160 can select the semantic label of "kitchen device" as the given semantic label for the given assistant device since the labels associated with the additional assistant devices that are locationally proximate to the given assistant device are cooking-related. The unique identifiers or labels can be processed using the semantic classifier(s) stored in the ML model(s) database 192 in the same or similar manner described above with respect to processing the queries, commands, and/or requests.

In some implementations, the semantic labelling engine 160 can automatically assign the given semantic label to the given assistant device in a device topology representation of the ecosystem (e.g., stored in the device topology database 193). In some additional or alternative implementations, the semantic labelling engine 160 can cause the automated assistant 120 to generate a prompt that includes the candidate semantic labels. The prompt can solicit, from a user that is associated with the ecosystem, a selection of one of the candidate labels as the given semantic label. Further, the prompt can be rendered visually and/or audibly at a given one of the assistant devices (that may or may not be the given assistant device to which the given semantic label is being assigned) and/or a client device (e.g., a mobile device) of the user. In response to receiving the selection of one of the candidate labels as the given semantic label, the given semantic label that is selected can be assigned to the given assistant device in the device topology representation of the ecosystem (e.g., stored in the device topology database 193). In some versions of these implementations, the given semantic label that is assigned to the given assistant device can be added to a list of semantic labels for the given assistant device. In other words, multiple semantic labels can be associated with the given assistant device. In other versions of these implementations, the given semantic label that is assigned to the given assistant device can supplant any other semantic label for the given assistant device. In other words, only a single semantic label may be associated with the given assistant device.

In some implementations, the query/command processing engine 170 can process a query, request, or command that is directed to the automated assistant 120 and that is received via one or more of the assistant input devices 106. The query/command processing engine 170 can process the query, request, or command to select one or more of the assistant devices to satisfy the query or command. Notably, the one or more of the assistant devices that are selected to satisfy the query or command may differ from the one or more of the assistant input devices 106 that received the query or command. The query/command processing engine 170 can select the one or more assistant devices to satisfy the spoken utterance based on one or more criteria. The one or more criteria can include, for example, proximity of one or more of the devices to the user that provided the spoken utterance (e.g., determined using the presence sensors 105 described below), device capabilities of one or more of the devices in the ecosystem, semantic label(s) assigned to the one or more assistant devices, and/or other criteria for selecting assistant devices to satisfy spoken utterances.

For example, assume a display device is needed to satisfy the spoken utterance. In this example, candidate assistant devices considered in selecting the given assistant device to satisfy the spoken utterance may be limited to those that include the display device. If multiple assistant devices in the ecosystem include the display device, then the given assistant device that includes that display device and is most proximate to the user may be selected to satisfy the utterance. In contrast, in implementations where only speaker(s) are needed to satisfy the spoken utterance (e.g., a display device is not needed to satisfy the spoken utterance), candidate assistant devices considered in selecting the given assistant device to satisfy the spoken utterance may include those that have speaker(s) regardless of whether they include the display device.

As another example, assume the spoken utterance includes a semantic property that matches a semantic label assigned to a given assistant device. The query/command processing engine 170 can determine that the semantic property of the spoken utterance matches the semantic label assigned to the given assistant device by generating a first embedding corresponding to one or more terms of the spoken utterance (or text corresponding thereto) and a second embedding corresponding to one or more terms of the semantic label assigned to the given assistant device, and comparing the embeddings to determine whether a distance metric between the embeddings satisfies a distance threshold which indicates that the embeddings match (e.g., whether it is an exact match or a soft match). In this example, the query/command processing engine 170 can select the given assistant device to satisfy the spoken utterance based on spoken utterance matching the semantic label (and optionally in addition to or in lieu of proximity of the user that provided the spoken utterance to the given assistant device). In this manner, selection of the assistant devices to satisfy the spoken utterance can be biased towards the semantic labels that are assigned to the assistant devices as described herein.

In various implementations, one or more of the assistant input devices 106 may include one or more respective presence sensors $105_{1-N}$ (also referred to herein simply as "presence sensors 105") that are configured to provide, with approval from corresponding user(s), signals indicative of detected presence, particularly human presence. In some of those implementations, the automated assistant 120 can identify one or more of the assistant input devices 106 to satisfy a spoken utterance from a user that is associated with the ecosystem based at least in part of presence of the user at or one or more of the assistant input devices 106. The spoken utterance can be satisfied by rendering responsive content (e.g., audibly and/or visually) at one or more of the assistant input devices 106, by causing one or more of the assistant input devices 106 to be controlled based on the spoken utterance, and/or by causing one or more of the assistant input devices 106 to perform any other action to satisfy the spoken utterance. As described herein, the automated assistant 120 can leverage data determined based on the respective presence sensors 105 in determining those assistant input devices 106 based on where a user is near or was recently near, and provide corresponding commands to only those assistant input devices 106. In some additional or alternative implementations, the automated assistant 120 can leverage data determined based on the respective presence sensors 105 in determining whether any user(s) (any users or specific users) are currently proximal to any of the assistant input devices 106, and can optionally suppress provision of commands based it is determined that no users (any users or specific users) are proximal to any of the assistant input devices 106.

The respective presence sensors 105 may come in various forms. Some assistant input devices 106 may be equipped with one or more digital cameras that are configured to capture and provide signal(s) indicative of movement detected in their fields of view. Additionally or alternatively, some assistant input devices 106 may be equipped with other types of light-based presence sensors 105, such as passive infrared ("PIR") sensors that measure infrared ("IR") light radiating from objects within their fields of view. Additionally or alternatively, some assistant input devices 106 may be equipped with presence sensors 105 that detect acoustic (or pressure) waves, such as one or more microphones. Moreover, in addition to the assistant input devices 106, one or more of the assistant non-input devices 185 can additionally or alternatively include respective presence sensors 105 described herein, and signals from such sensors can additionally be utilized by the automated assistant 120 in determining whether and/or how to satisfy spoken utterances according to implementations described herein.

Additionally or alternatively, in some implementations, the presence sensors 105 may be configured to detect other phenomena associated with human presence or device presence in the ecosystem. For example, in some embodiments, a given one of the assistant devices may be equipped with a presence sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem (e.g., described with respect to the event detection engine 130). For example, some of the assistant devices may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones).

Additionally or alternatively, various assistant devices may emit other types of human-imperceptible waves, such as radio waves (e.g., Wi-Fi, Bluetooth, cellular etc.) that may be detected by other assistant devices carried/operated by a particular user (e.g., a mobile device, a wearable computing device, etc.) and used to determine an operating user's particular location. In some implementations, Wi-Fi triangulation may be used to detect a person's location, e.g., based on Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally or alternatively, in some implementations, one or more of the assistant input devices 106 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 105 of the assistant devices. In some implementations, based on such detected movement, a location of the user may be predicted, and this location may be assumed to be the user's location when any content is caused to be rendered at the assistant devices based at least in part on proximity of those assistant device(s) to the user's location. In some implementations, the user may simply be assumed to be in the last location at which he or she engaged with the automated assistant 120, especially if not much time has passed since the last engagement.

Each of the assistant input devices 106 further includes respective user interface component(s) $107_{1-N}$ (also referred to herein simply as "user interface component(s) 107"), which can each include one or more user interface input devices (e.g., microphone, touchscreen, keyboard) and/or one or more user interface output devices (e.g., display, speaker, projector). As one example, user interface components $107_1$ of assistant input device $106_1$ can include only speaker(s) and microphone(s), whereas user interface components $107_N$ of assistant input device $106_N$ can include speaker(s), a touchscreen, and microphone(s). Additionally or alternatively, in some implementations, the assistant non-input devices 185 may include one or more user interface input devices and/or one or more user interface output devices of the user interface component(s) 107, but the user input devices (if any) for the assistant non-input devices 185 may not allow the user to directly interact with the automated assistant 120.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant 120 may be distributed across multiple computer systems. The automated assistant 120 may be implemented as, for example, computer programs running on one or more computers in one or more locations that are coupled to each other through a network (e.g., any of the networks 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module $114_{1-N}$ (also referred to herein simply as "speech capture/TTS/STT module 114"). In other implementations, one or more aspects of the respective speech capture/TTS/

STT module 114 may be implemented separately from the respective automated assistant client 118.

Each respective speech capture/TTS/STT module 114 may be configured to perform one or more functions including, for example: capture a user's speech (speech capture, e.g., via respective microphone(s) (which in some cases may comprise the presence sensor 105)); convert that captured audio to text and/or to other representations or embeddings (STT) using speech recognition model(s) stored in the ML model(s) database 192; and/or convert text to speech (TTS) using speech synthesis model(s) stored in the ML model(s) database 192. Instance(s) of these model(s) may be stored locally at each of the respective assistant input devices 106 and/or accessible by the assistant input devices (e.g., over the networks 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122) using speech recognition model(s) stored in the ML model(s) database 192. Cloud-based TTS module 116 may be configured to leverage the virtually limitless resources of the cloud to convert textual data (e.g., text formulated by automated assistant 120) into computer-generated speech output using speech synthesis model(s) stored in the ML model(s) database 192. In some implementations, the cloud-based TTS module 116 may provide the computer-generated speech output to one or more of the assistant devices to be output directly, e.g., using respective speaker(s) of the respective assistant devices. In other implementations, textual data (e.g., a client device notification included in a command) generated by the automated assistant 120 using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) of the respective assistant devices.

The automated assistant 120 (and in particular, the one or more cloud-based automated assistant components 119) may include a natural language processing (NLP) module 122, the aforementioned cloud-based TTS module 116, the aforementioned cloud-based STT module 117, and other components, some of which are described in more detail below. In some implementations, one or more of the engines and/or modules of automated assistant 120 may be omitted, combined, and/or implemented in a component that is separate from automated assistant 120. An instance of the NLP module 122 may additionally or alternatively be implemented locally at the assistant input devices 106.

In some implementations, the automated assistant 120 generates responsive content in response to various inputs generated by a user of one of the assistant input devices 106 during a human-to-computer dialog session with the automated assistant 120. The automated assistant 120 may provide the responsive content (e.g., over one or more of the networks 110 of FIG. 1 when separate from the assistant devices) for presentation to the user as part of the dialog session via the assistant input devices 106 and/or the assistant non-input devices 185. For example, the automated assistant 120 may generate responsive content in response to free-form natural language input provided via one of the assistant input devices 106. As used herein, free-form input is input that is formulated by a user and that is not constrained to a group of options presented for selection by the user.

The NLP module 122 of the automated assistant 120 processes natural language input generated by users via the assistant input devices 106 and may generate annotated output for use by one or more other components of the automated assistant 120, the assistant input devices 106, and/or the assistant non-input devices 185. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

Although FIG. 1 is depicted as having a particular configuration of components implemented by the assistant devices and/or server(s), and is depicted having the assistant devices and/or server(s) communicating over particular networks, it should be understood that is for the sake of example and is not meant to be limiting. For example, the assistant input devices 106 and the assistant non-input devices may be directly communicatively coupled with each other over one or more networks (not depicted). As another example, operations of the one or more cloud-based automated assistant components 119 can be implemented locally at one or more of the assistant input devices 106 and/or one or more of the assistant non-input devices. As yet another example, instance(s) of various ML models stored in the ML model(s) database 192 may be stored locally at the assistant devices, and/or instance(s) of a device topology representation of an ecosystem stored in the device topology database 193 may be stored locally at the assistant input devices. Further, in implementations where data (e.g., device activity, audio data or recognized text corresponding thereto, device topology representations, and/or any other data described herein) is transmitted over any of the one or more networks 110 of FIG. 1, the data can be encrypted, filtered, or otherwise protected in any manner to ensure privacy of user(s).

By using the techniques described herein to detect and verify the occurrence of acoustic events using multiple assistant devices in the ecosystem, a quantity of false positives of acoustic events can be reduced. As a result, both computational and network resources can be conserved. For example, by using the techniques described herein in detecting and verifying the occurrence of hotword events in the ecosystem, components and/or functionalities of an automated assistant may be kept dormant when, absent these techniques, may have been activated even though they were not intended to be activated. As another example, by using the techniques described herein in detecting and verifying the occurrence of particular sounds in the ecosystem, notifications presented to a user associated with the ecosystem can be withheld when, absent these techniques, may have been presented even though the acoustic event did not in fact occur. Moreover, by using the techniques described herein to anticipate which assistant devices in the ecosystem should detect temporally corresponding audio data that captures the acoustic events, a quantity of the assistant devices that process the audio data can be reduced. Also as a result, both computational and network resources can be conserved. For example, by using the techniques described herein in anticipating the assistant devices in the ecosystem that should have detected the acoustic event, other assistant devices that may have captured temporally corresponding audio data that likely does not correspond to the acoustic event may not be considered in determining whether the acoustic event is the actual acoustic event.

Figure 2A:
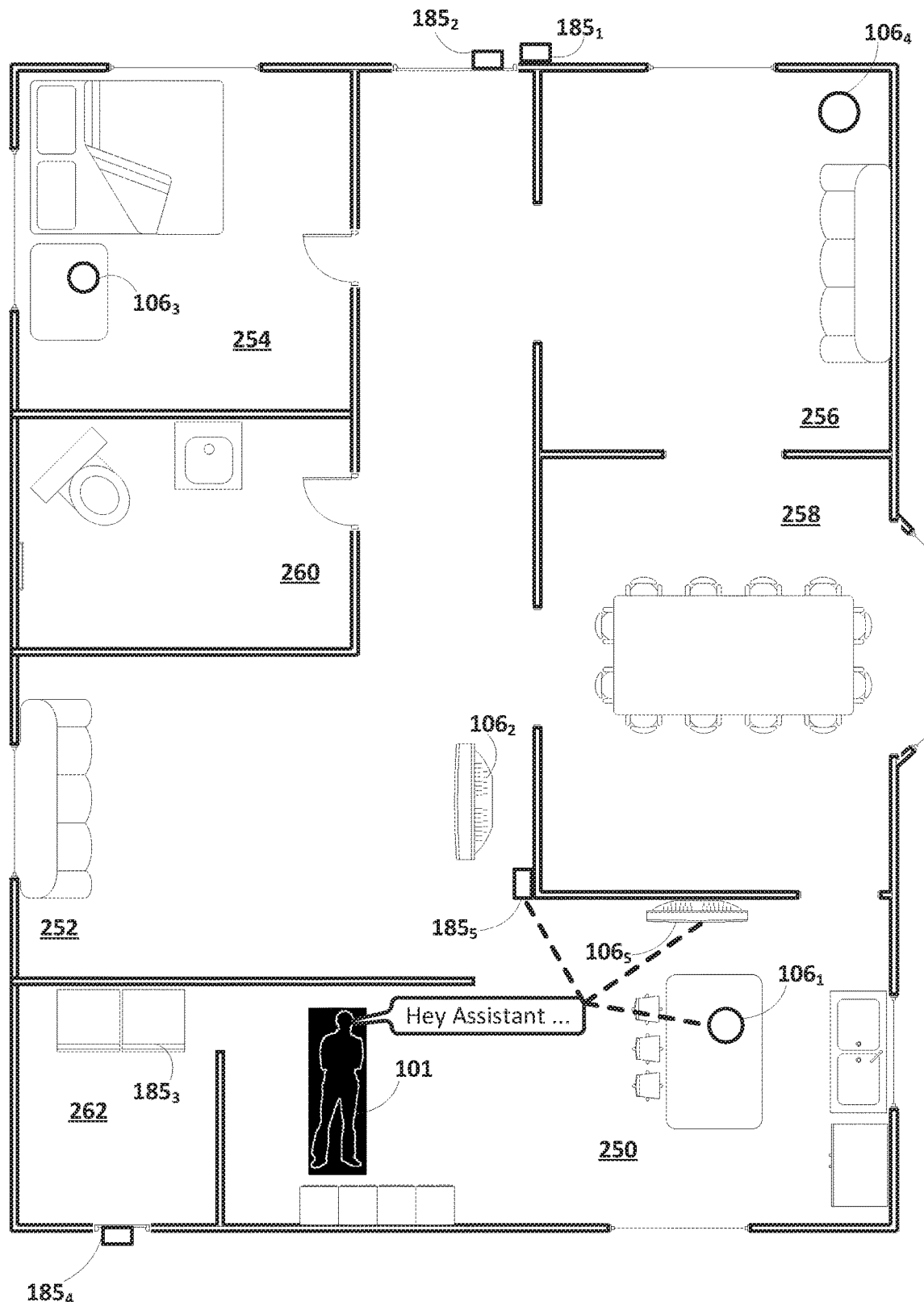
FIG. 2A and FIG. 2B depict some examples associated with simultaneous acoustic event detection of a hotword event at a plurality of assistant devices in an ecosystem, in accordance with various implementations.
Figure 2B:
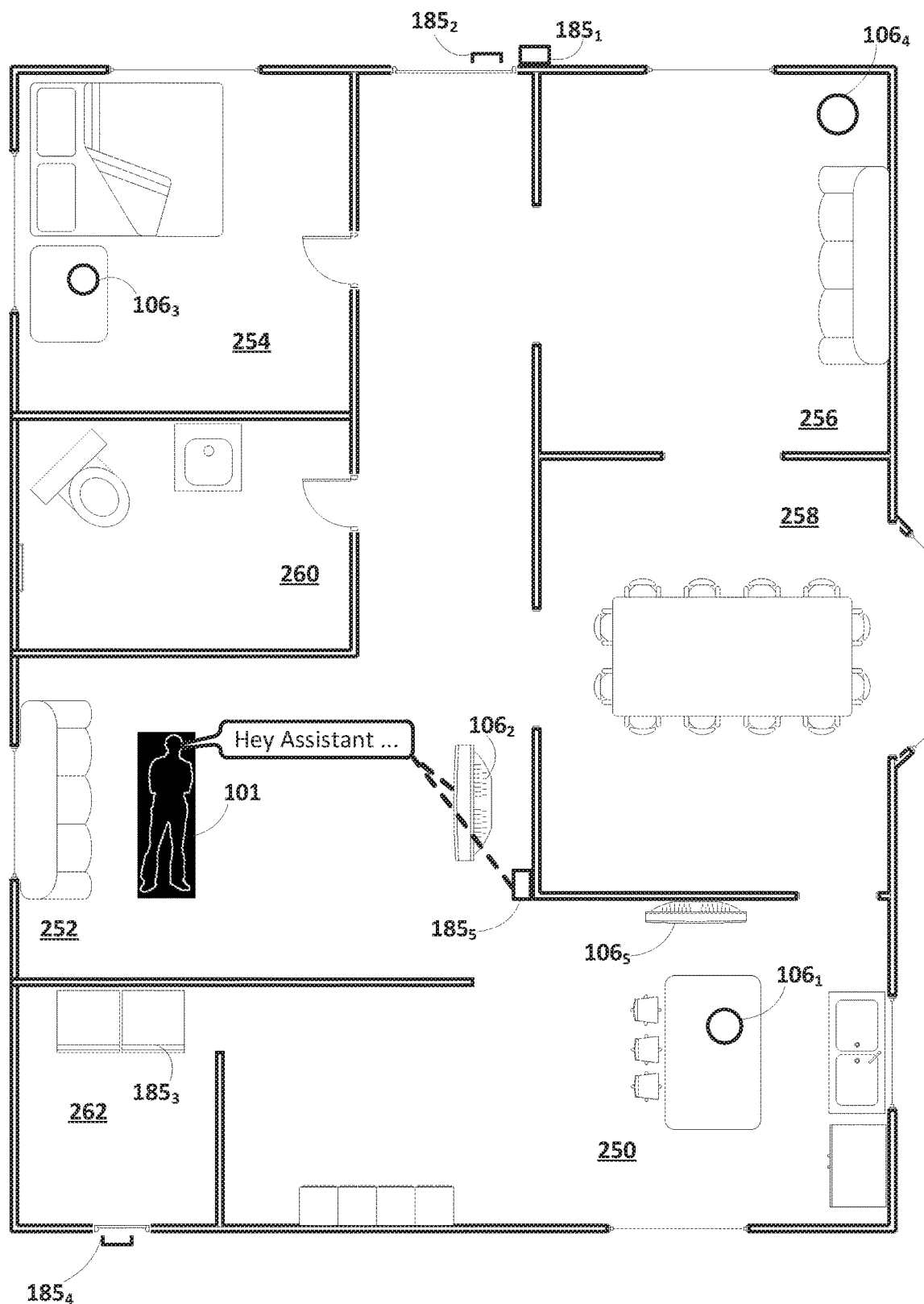
Figure 3:
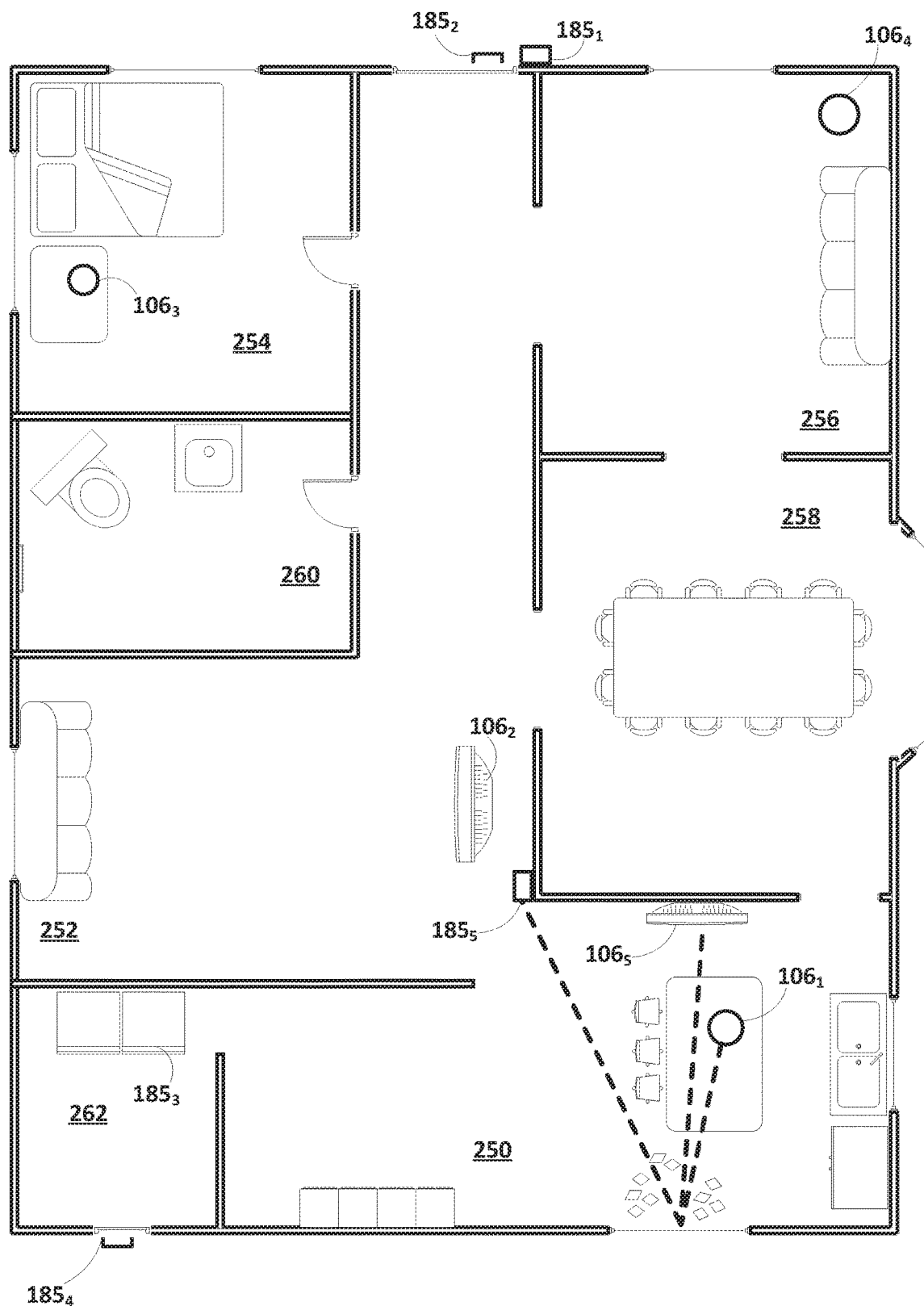
FIG. 3 depicts an example associated with simultaneous acoustic event detection of a particular sound event at a plurality of assistant devices in an ecosystem, in accordance with various implementations.

Additional description of various components of FIG. 1 is now provided with reference to FIGS. 2A, 2B, and 3. A home floorplan is depicted in FIGS. 2A, 2B, and 3. The depicted floorplan includes a plurality of rooms, 250-262. A plurality of assistant input devices $106_{1-5}$ are deployed throughout at least some of the rooms. Each of the assistant input devices $106_{1-5}$ may implement an instance of automated assistant client 118 configured with selected aspects of the present disclosure and may include one or more input devices, such as microphone(s) that are capable of capturing utterances spoken by a person nearby. For example, a first assistant input device $106_1$ taking the form of an interactive standalone speaker and display device (e.g., display screen, projector, etc.) is deployed in room 250, which in this example is a kitchen. A second assistant input device $106_2$ taking the form of a so-called "smart" television (e.g., a networked television with one or more processors that implement a respective instance of the automated assistant client 118) is deployed in room 252, which in this example is a den. A third assistant input device $106_3$ taking the form of an interactive standalone speaker without a display is deployed in room 254, which in this example is a bedroom. A fourth assistant input device $106_4$ taking the form of another interactive standalone speaker is deployed in room 256, which in this example is a living room. A fifth assistant input device $106_5$ also taking the form of a smart television is also deployed in room 250, which in this example is a kitchen.

While not depicted in FIGS. 2A, 2B, and 3, the plurality of assistant input devices $106_{1-4}$ may be communicatively coupled with each other and/or other resources (e.g., the Internet) via one or more wired or wireless WANs and/or LANs (e.g., via the networks 110 of FIG. 1). Additionally, other assistant input devices—particularly mobile devices such as smart phones, tablets, laptops, wearable devices, etc.—may also be present, e.g., carried by one or more persons in the home and may or may not also be connected to the same WANs and/or LANs. It should be understood that the configuration of assistant input devices depicted in FIGS. 2A, 2B, and 3 is just one example; more or fewer and/or different assistant input devices 106 may be deployed across any number of other rooms and/or areas of the home, and/or in locations other than a residential home (e.g., a business, a hotel, a public place, an airport, a vehicle, and/or other locations or spaces).

Further depicted in FIGS. 2A, 2B, and 3 are a plurality of assistant non-input devices $185_{1-5}$. For example, a first assistant non-input device $185_1$ taking the form of a smart doorbell is deployed on the exterior of the home near a front door of the home. A second assistant non-input device $185_2$ taking the form of a smart lock is deployed on the exterior of the home on the front door of the home. A third assistant non-input device $185_3$ taking the form of a smart clothes washer is deployed in room 262, which in this example is a laundry room. A fourth assistant non-input device $185_4$ taking the form of a door open/close sensor is deployed near a rear door in room 262, and detects whether the rear door is open or closed. A fifth assistant non-input device $185_5$ taking the form of a smart thermostat is deployed in room 252, which in this example is a den.

Each of the assistant non-input devices 185 can communicate (e.g., via the networks 110 of FIG. 1) with a respective assistant non-input system 180 (shown in FIG. 1) to provide data to the respective assistant non-input system 180 and optionally to be controlled based on commands provided by the respective assistant non-input system 180. One or more of the assistant non-input devices 185 can additionally or alternatively communicate (e.g., via the networks 110 of FIG. 1) directly with one or more of the assistant input devices 106 to provide data to one or more of the assistant input devices 106 and optionally to be controlled based on commands provided by one or more of the assistant input devices 106. It should be understood that the configuration of assistant non-input devices 185 depicted in FIGS. 2A, 2B, and 3 is just one example; more or fewer and/or different assistant non-input devices 185 may be deployed across any number of other rooms and/or areas of the home, and/or in locations other than a residential home (e.g., a business, a hotel, a public place, an airport, a vehicle, and/or other locations or spaces).

In various implementations, acoustic events can be detected at multiple assistant devices that are co-located in the ecosystem (e.g., any of the assistant input devices 106 and/or the assistant non-input devices 185 that include respective microphone(s)). For example, the acoustic event can be captured in audio data detected via microphone(s) of a given assistant device in the ecosystem and can also be captured in respective audio data detected via respective microphone(s) of at least one additional assistant in the ecosystem. The audio data captured by the assistant devices can be processed, using event detection model(s) that are stored locally at the respective assistant devices and/or stored remotely at server(s) and accessible by the respective assistant devices, to generate respective measures that are associated with the acoustic event. Further, each of these measures can be processed to determine whether the acoustic event corresponds to an actual acoustic event that occurred in the ecosystem. If the acoustic event is the actual acoustic event, an action can be performed based on an occurrence of the actual acoustic event in the ecosystem. Otherwise, the audio data can be discarded.

In some implementations, one or more of the assistant devices (e.g., the given assistant device and the at least one additional assistant device) can process the respective audio data, locally at the respective assistant devices and using respective event detection models, to generate respective measures that are indicative of whether the respective audio data detected at each of these assistant devices captures the acoustic event. In some additional or alternative implementations, one or more of the assistant devices can each transmit the audio data to a given assistant device (e.g., one of the assistant devices that detected audio data or a distinct assistant device that did not detect any audio data) in the ecosystem to process the respective audio data, locally at the given assistant device and using an event detection model, to generate respective measures that are indicative of whether the respective audio data detected at each of these assistant devices captures the acoustic event. In some additional or alternative implementations, one or more of the assistant devices can each transmit the audio data to a remote system that is distinct from the ecosystem to process the respective audio data, remotely at the remote system and using an event detection model, to generate respective measures that are indicative of whether the respective audio data detected at each of these assistant devices captures the acoustic event.

In some implementations, the at least one additional assistant device in the ecosystem can be identified in response to the given assistant device detecting the audio data that captures the acoustic event. If the acoustic event detected at the given assistant device is in fact an actual acoustic event, then the at least one additional assistant device that is identified in the ecosystem should have detected temporally corresponding audio data that also captures the acoustic event. The audio data captured by the assistant devices can be considered temporally corresponding audio data based on, for example, respective timestamps associated with the audio data captured at the assistant devices. For instance, the audio data can be considered temporally corresponding audio data when the timestamps match or are within a threshold duration of time of each other (e.g., within several milliseconds, several seconds, or any other suitable duration of time). In some versions of those implementations, the at least one additional assistant device can be identified based on, for example, the given assistant device and the at least one additional assistant device historically detecting audio data that captures the same acoustic event. In some additional or alternative versions of those implementations, the at least one additional assistant device can be identified based on, for example, the given assistant device and the at least one additional assistant device belonging to a same group of assistant devices in a device topology representation of the ecosystem.

In some implementations, the acoustic event is a hotword event, and the event detection models correspond to hotword detection model(s). The hotword event can correspond to detecting a particular word or phrase that, when detected, causes one or more components or functionalities of an automated assistant to be activated. For instance, and referring specifically to FIGS. 2A and 2B, assume a user 101 that is associated with the ecosystem depicted in FIGS. 2A and 2B, provides a spoken utterance of "Hey Assistant . . . " that is detected by multiple assistant devices in the ecosystem. For example, and as shown in FIG. 2A, the user 101 may be located in room 250 when the spoken utterance is provided, which in this example is the kitchen. In this example, assume that audio data corresponding to the spoken utterance of "Hey Assistant . . . " is detected at the first assistant input device $106_1$, (e.g., as indicated by a dashed line from the text bubble corresponding to the spoken utterance to the first assistant input device $106_1$). Further assume that the fifth assistant input device $106_5$ and the fifth assistant non-input device $185_5$ (assuming the smart thermostat includes microphone(s)) are also anticipated to detect audio data that captures the hotword (e.g., also as indicated by dashed lines). In this example, the fifth assistant input device $106_5$ may be anticipated to detect the audio data based on the first assistant input device $106_1$ and the fifth assistant input device $106_5$ being included in the same group of devices (e.g., a "kitchen" group) and/or based on the first assistant input device $106_1$ and the fifth assistant input device $106_5$ having previously detected temporally corresponding audio data that captures the same spoken utterances. Further, the fifth assistant non-input device $185_5$ may be anticipated to detect the audio data based on the first assistant input device $106_1$ and the fifth assistant non-input device $185_5$ having previously detected temporally corresponding audio data that captures the same spoken utterances (e.g., assuming that the first assistant input device $106_1$ belongs to a "kitchen" group and the fifth assistant non-input device $185_5$ belongs to a "den" group).

Moreover, assume that the measure generated based on the audio data detected at first assistant input device $106_1$ indicates the audio data captures the hotword and assume that the measure generated based on the audio data detected at the fifth assistant input device $106_5$ indicates the audio data captures the hotword, but that the measure generated based on the audio data detected at the fifth assistant non-input device $185_5$ indicates the audio data does not capture the hotword. In this example, it may be determined that the hotword detected in the ecosystem is actually a hotword, and one or more components or functionalities of an automated assistant can be activated, even though the fifth assistant non-input device $185_5$ indicates the audio data does not capture the hotword since the other assistant devices indicate that the hotword was captured in the spoken utterance (or even if the fifth assistant non-input device $185_5$ did not detect any audio data at all). In contrast, assume that the measure generated based on the audio data detected at first assistant input device $106_1$ indicates the audio data captures the hotword, but that the measures generated based on the audio data detected at the fifth assistant input device $106_5$ and the fifth assistant non-input device $185_5$ indicates the audio data does not capture the hotword. In this example, it may be determined that the hotword detected in the ecosystem is not actually a hotword, and one or more components or functionalities of an automated assistant can be kept dormant, even though the first assistant input device $106_1$ indicates the audio data captures the hotword since the other assistant devices indicate that the hotword was not captured in the spoken utterance.

As another example, and as shown in FIG. 2B, the user 101 may be located in room 252 when the spoken utterance is provided, which in this example is the den. In this example, assume that audio data corresponding to the spoken utterance of "Hey Assistant . . . " is detected at the first assistant input device $106_1$, (e.g., as indicated by a dashed line from the text bubble corresponding to the spoken utterance to the first assistant input device $106_1$). Further assume that the fifth assistant non-input device $185_5$ (assuming the smart thermostat includes microphone(s)) is also anticipated to detect audio data that captures the hotword (e.g., also as indicated by a dashed line). In this example, the fifth assistant non-input device $185_5$ may be anticipated to detect the audio data based on the second assistant input device $106_2$ and the fifth assistant non-input device $185_5$ being included in the same group of devices (e.g., a "den" group) and/or based on the second assistant input device $106_5$ and the fifth assistant non-input device $185_5$ having previously detected temporally corresponding audio data that captures the same spoken utterances.

Moreover, assume that the measure generated based on the audio data detected at second assistant input device $106_2$ indicates the audio data captures the hotword and assume that the measure generated based on the audio data detected at the fifth assistant non-input device $185_5$ indicates the audio data captures the hotword. In this example, it may be determined that the hotword detected in the ecosystem is actually a hotword, and one or more components or functionalities of an automated assistant can be activated. In contrast, assume that the measure generated based on the audio data detected at the second assistant input device $106_2$ indicates the audio data captures the hotword, but that the measure generated based on the audio data detected at the fifth assistant non-input device $185_5$ indicates the audio data does not capture the hotword. In this example, whether it is determined that the hotword detected in the ecosystem is actually a hotword may be based on whether the measure generated based on the audio data detected at the fifth assistant non-input device $185_5$ is within a threshold range of a threshold that indicates the measure is indicative of a hotword. For instance, assume the measures that are associated with the hotword event are probabilities. Further assume a measure generated based on the audio data detected by the second assistant input device $106_2$ is 0.7, a measure generated based on the audio data detected by the fifth assistant non-input device $185_5$ is 0.6, and a threshold for determining that the hotword is an actual hotword is 0.65. As a result, the acoustic event may not be considered a hotword since the measure associated with the second assistant input device $106_2$ with is indicative of an occurrence of a hotword, but the measure associated with the fifth assistant non-input device $106_2$ with is not indicative of an occurrence of a hotword. However, further assume that if the measure generated based on the audio data detected by the fifth assistant non-input device $185_5$ (e.g., 0.6) is within 0.1 of the threshold (e.g., 0.65), then the acoustic event may not be considered a hotword. Accordingly, even though both devices are not highly confident that a hotword was detected in the ecosystem, the acoustic event can be considered an occurrence of a hotword. In contrast, assume the measure generated based on the audio data detected by the fifth assistant non-input device $185_5$ is 0.1. In this example, the acoustic event would not be considered an occurrence of a hotword, even though the measure generated based on the audio data detected by the second assistant input device $106_2$ is 0.7 is indicative of a hotword, since the measure generated based on the audio data detected by the fifth assistant non-input device $185_5$ fails to satisfy the threshold (e.g., 0.65) and is not within the threshold range of the threshold. In these examples, additional or alternative processing of the measures can be utilized to determine whether the hotword event is an actual hotword event. For instance, one or more of a mean, median, maximum, minimum, or percentile of the measures generated based on the respective audio data detected at the assistant devices can be utilized to determine whether the hotword event is an actual hotword event. One or more of the measures can optionally be weighted in determining one or more of these statistics based on, for example, proximity to the user 101 (e.g., determined using the presence sensors 105 of FIG. 1), types of components of the assistant devices (e.g., an assistant device having multiple microphones vs. an assistant device having a single microphone), and/or based on other factors.

Although FIGS. 2A and 2B are described herein with respect to the hotword event that activates one more of the automated assistant components or functionalities being an acoustic event, it should be understood that is for the sake of example and is not meant to be limiting. Additionally or alternatively, a hotwordfree event may also be detected by multiple assistant devices in the ecosystem. The hotwordfree event can include, for example, detecting a gaze directed to a given one of the assistant devices (and optionally coupled with mouth movement of the user 101) that, when detected, causes one more of the automated assistant components or functionalities to be activated. For instance, respective image data can be captured by multiple of the assistant devices (e.g., that include vision components described with respect to the presence sensors), the respective image data can be processed, using hotwordfree model(s) (e.g., stored in the ML model(s) database 192), to generate the respective measures, and the respective measures can be processed to determine whether the hotwordfree event is an actual hotwordfree event. These techniques can also be utilized to detect other visual events that may occur in the ecosystem.

Moreover, although FIGS. 2A and 2B are described herein with respect to the acoustic event being a hotword event, it should be understood that is for the sake of example and is not meant to be limiting. As another non-limiting example, and referring specifically to FIG. 3, any audio data captured in the environment can additionally or alternatively be processed using sound detection model(s) that are trained to detect occurrences of particular sounds in the ecosystem. For instance, assume that a window in room 250 is broken (rather than the user 101 providing the spoken utterance), and further assume that the audio data captured by the first assistant input device $106_1$ is processed using a respective sounds detection model that is trained to generate a measure associated with detecting an occurrence of broken glass (and optionally additional measures associated with other sounds, such as a doorbell ringing, a smoke alarm sounding, and/or other sounds that may occur in the ecosystem). Similar to described above with respect to FIG. 2A, additional assistant device(s) (e.g., the fifth assistant input device $106_5$ and the fifth assistant non-input device $185_5$) in the ecosystem may be identified as being anticipated to detect temporally corresponding audio data, process the temporally corresponding audio data to generate additional measure(s), and determine based on the measure and the additional measure(s) if, in fact, a sound corresponding to glass breaking was captured in the ecosystem. As a result, a notification that indicates the sound of breaking glass was detected in the ecosystem can be rendered at a client device of the user 101 (e.g., a mobile device and/or one or more of the assistant device(s) in the ecosystem), and optionally include an indication of the assistant devices that detected the glass breaking and/or an indication of a room in the ecosystem in which the sound of the of the glass breaking was detected.

Although FIGS. 2A, 2B, and 3 are described herein with respect to acoustic events (and visual events), it should be understood that is for the sake of example and is not meant to be limiting. The techniques described herein can be utilized to verify occurrences of any event that may be detected by multiple assistant devices in an ecosystem. For example, assume a first assistant device is a mobile device being carried by the user 101 that includes an accelerometer, and assume a second assistant device is a smartwatch being worn by the user 101 that also includes an accelerometer. In this example, respective accelerometer data generated by the mobile device and the smartwatch can be processed in the same or similar manner described above to determine whether a detected accelerometer event is an actual accelerometer event (e.g., the user 101 walking, jogging, running, and/or any other motion activity that can be detected by accelerometers).

Figure 4:
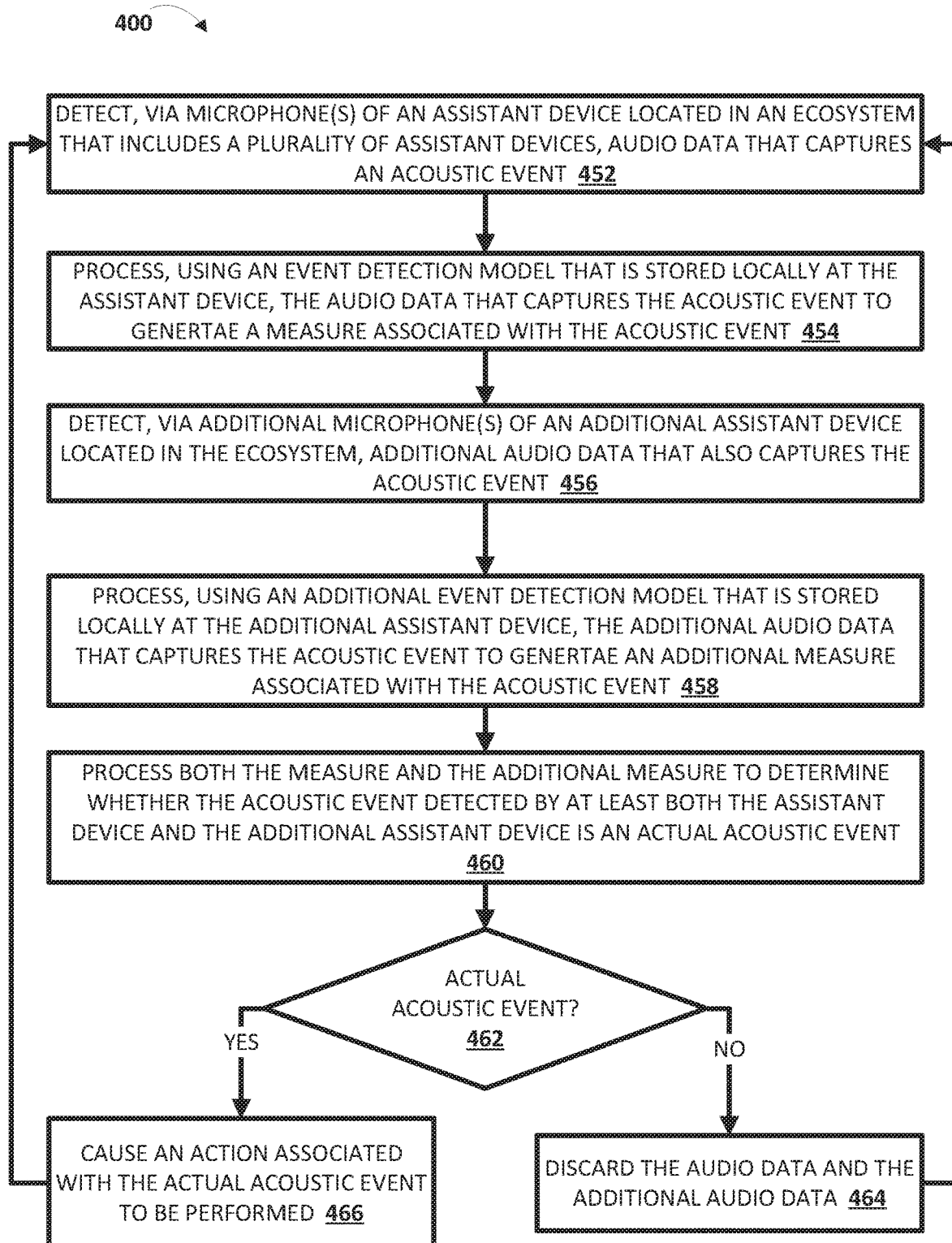
FIG. 4 is a flowchart illustrating an example method of determining whether an acoustic event is an actual acoustic event based on audio data captured at a plurality of assistant devices in an ecosystem, in accordance with various implementations.

Turning now to FIG. 4, a flowchart illustrating an example method 400 of determining whether an acoustic event is an actual acoustic event based on audio data captured at a plurality of assistant devices in an ecosystem is depicted. For convenience, the operations of the method 400 is described with reference to a system that performs the operations. The system of the method 400 includes one or more processors and/or other component(s) of a computing device. For example, the system of the method 400 can be implemented by an assistant input device 106 of FIG. 1, 2A, 2B, or 3, an assistant non-input device 185 of FIG. 1, 2A, 2B, or 3, computing device 610 of FIG. 6, one or more servers, other computing devices, and/or any combination thereof. Moreover, while operations of the method 400 are shown in a particular order, this is not meant to be limiting. One or more operations may be reordered, omitted, and/or added.

At block 452, the system detects, via microphone(s) of an assistant device located in an ecosystem that includes a plurality of assistant devices, audio data that captures an acoustic event. The detected acoustic event can be, for example, a particular word or phrase (e.g., a hotword) that is provided by a user that is associated with the ecosystem, a particular sound in the ecosystem that does not correspond to human speech, and/or other acoustic events that may occur in the ecosystem.

At block 454, the system processes, using an event detection model that is stored locally at the assistant device, the audio data that captures the acoustic event to generate a measure associated with the acoustic event. In some implementations, the audio data that captures the acoustic event can be processed, using a hotword detection model stored locally at the assistant device, to generate a measure that is indicative of whether the audio data detected at the assistant device includes the particular word or phrase (e.g., to activate one or more components of an automated assistant). In some additional or alternative implementations, the audio data that captures the acoustic event can be processed, using a sound detection model stored locally at the assistant device, to generate a measure that is indicative of whether the audio data detected at the assistant device includes the particular sound (e.g., glass breaking, a dog barking, a cat meowing, a doorbell ringing, a smoke alarm sounding, a carbon monoxide detector sounding, a baby crying, knocking on a door, and/or any other sounds that may occur in the ecosystem).

At block 456, the system detects, via additional microphone(s) of an additional assistant device located in the ecosystem, additional audio data that also captures the acoustic event. The additional audio data detected at the additional assistant device may temporally correspond to the audio data detected at the assistant device. The system can determine that the additional audio data temporally corresponds to the audio data based on respective timestamps that correspond to when the audio data and the additional audio data were received, respectively. Further, the additional audio data can be considered to temporally correspond to the audio data if the timestamps match or are within a threshold duration of time of each other (e.g., within several milliseconds, several seconds, or any other suitable duration of time).

At block 458, the system processes, using an additional event detection model that is stored locally at the additional assistant device, the additional audio data that captures the acoustic event to generate an additional measure associated with the acoustic event. In some implementations, the additional audio data that captures the acoustic event can be processed, using an additional hotword detection model stored locally at the additional assistant device, to generate an additional measure that is indicative of whether the additional audio data detected at the additional assistant device includes the particular word or phrase (e.g., to activate one or more components of an automated assistant). In some additional or alternative implementations, the additional audio data that captures the acoustic event can be processed, using an additional sound detection model stored locally at the additional assistant device, to generate an additional measure that is indicative of whether the additional audio data detected at the additional assistant device includes the particular sound (e.g., glass breaking, a dog barking, a cat meowing, a doorbell ringing, a smoke alarm sounding, a carbon monoxide detector sounding, and/or any other sounds that may occur in the ecosystem).

At block 460, the system processes both the measure and the additional measure to determine whether the acoustic event detected by at least both the assistant device and the additional assistant device is an actual acoustic event. The measure and the additional measure can be, for example, a binary value that is indicative of whether the audio data captures the acoustic event (e.g., "1" for yes and "0" for no), a probability that is associated with whether the acoustic event occurred (e.g., 0.7 that the audio data captures the acoustic event vs. 0.3 that the audio data does not capture the acoustic event), and/or other measures associated with the acoustic event.

At block 462, the system determines whether the acoustic event is an actual acoustic event based on processing the measure and the additional measure at block 460. If, at an iteration of block 462, the system determines the acoustic event is not the actual acoustic event, then the system proceeds to block 464 and discards the audio data and the additional audio data without any further processing. The system then returns to block 452. For instance, assume the measure and the additional measure correspond to a probability that the audio data and the additional audio data capture a hotword, respectively. For example, assume that the measure is a probability of 0.7 that the audio data captures the hotword and assume that the additional measure is a probability of 0.3 that the additional audio data captures the hotword. In this example, the system may determine that the acoustic event is an actual acoustic event (e.g., the user did provide a spoken utterance that includes the hotword) assuming that the probability of 0.7 satisfies a threshold probability level based solely on the measure. However, the system may determine that the acoustic event is not an actual acoustic event (e.g., the user did not provide a spoken utterance that includes the hotword) assuming that the probability of 0.3 fails to satisfy the threshold probability level based on the additional measure. As a result, the system may determine that the acoustic event is not an actual acoustic event, even though the measure indicates that the acoustic event was an actual acoustic event, since the additional measure should also indicate that the acoustic event was an actual acoustic event, and the audio data and the additional audio data can be discarded. Additionally or alternatively, the system can determine whether the acoustic event is the actual acoustic event based on statistics associated with the measures, such as one or more of a mean, median, maximum, minimum, or percentile of the measures generated based on the respective audio data detected at the assistant devices can be utilized to determine whether the acoustic event is an actual acoustic event If, at an iteration of block 462, the system determines the acoustic event is the actual acoustic event, then the system proceeds to block 466. For instance, assume the measure and the additional measure correspond to a probability that the audio data and the additional audio data capture a hotword, respectively. For example, assume that the measure is a probability of 0.7 that the audio data captures the hotword and assume that the additional measure is a probability of 0.8 that the additional audio data captures the hotword. In this example, the system may determine that the acoustic event is an actual acoustic event (e.g., the user did provide a spoken utterance that includes the hotword) assuming that the probability of 0.7 and the probability of 0.8 (or one or more statistics based thereon) satisfy a threshold probability level based on the measure and the additional measure, respectively. As a result, the system may determine that the acoustic event is an actual acoustic event since both the measure and the additional measure indicate that the acoustic event was an actual acoustic event.

At block 466, the system causes an action associated with the actual acoustic event to be performed. The system then returns to block 452. The action performed by the system may be based on the actual acoustic event captured in the audio data and the additional audio data. For example, in implementations where the actual acoustic event corresponds to an occurrence of a hotword, the system can activate one or more components or functions of an automated assistant (e.g., speech processing, natural language processing, and/or other components or functions of an automated assistant). As another example, in implementations where the actual acoustic event corresponds to an occurrence of a particular sound, the system can generate a notification that indicates the particular sound was detected in the ecosystem (and optionally identify which assistant devices that detected the particular sound), and can cause the notification to be rendered at a client device of the user that is associated with the ecosystem (e.g., a mobile device of the user, one or more of the assistant devices, and/or any other client device that is associated with the user).

Figure 5:
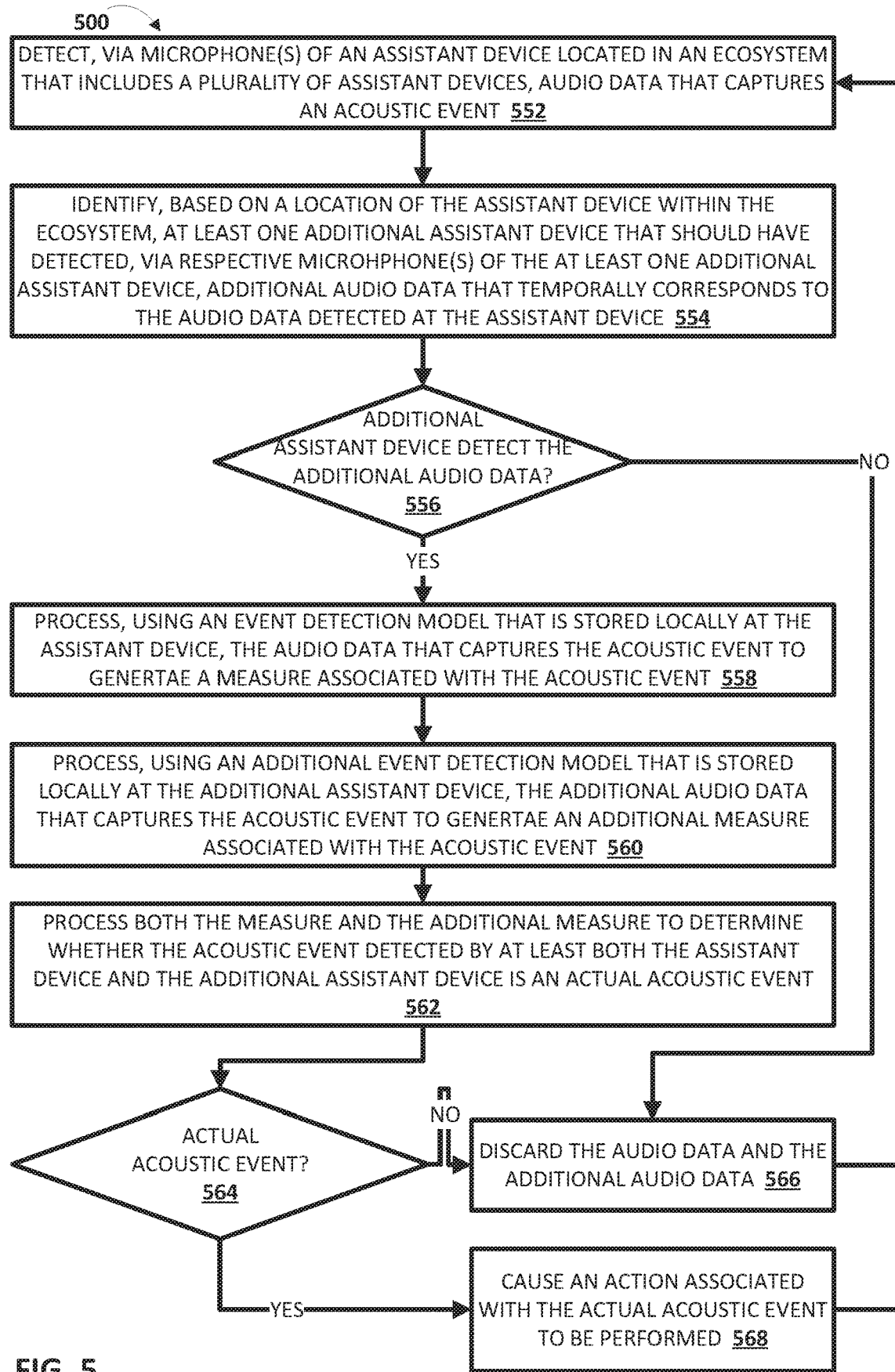
FIG. 5 is a flowchart illustrating an example method of identifying which assistant device(s) should have detected an acoustic event in an ecosystem based on a given assistant device detecting the acoustic event, in accordance with various implementations.

Turning now to FIG. 5, a flowchart illustrating an example method 500 of identifying which assistant device(s) should have detected an acoustic event in an ecosystem based on a given assistant device detecting the acoustic event is depicted. For convenience, the operations of the method 500 is described with reference to a system that performs the operations. The system of the method 500 includes one or more processors and/or other component(s) of a computing device. For example, the system of the method 500 can be implemented by an assistant input device 106 of FIG. 1, 2A, 2B, or 3, an assistant non-input device 185 of FIG. 1, 2A, 2B, or 3, computing device 610 of FIG. 6, one or more servers, other computing devices, and/or any combination thereof. Moreover, while operations of the method 500 are shown in a particular order, this is not meant to be limiting. One or more operations may be reordered, omitted, and/or added.

At block 552, the system detects, via microphone(s) of an assistant device located in an ecosystem that includes a plurality of assistant devices, audio data that captures an acoustic event. The detected acoustic event can be, for example, a particular word or phrase (e.g., a hotword) that is provided by a user that is associated with the ecosystem, a particular sound in the ecosystem that does not correspond to human speech, and/or other acoustic events that may occur in the ecosystem.

At block 554, the system identifies, based on a location of the assistant device within the ecosystem, at least one additional assistant device that should have detected, via respective microphone(s) at the at least one additional assistant device, additional audio data that temporally corresponds to the audio data detected at the assistant device. The system can identify the at least one additional assistant device that should have detected the additional audio data based on the assistant device and the at least one additional assistant device historically detecting temporally corresponding audio data. Further, the system can determine that the additional audio data temporally corresponds to the audio data based on respective timestamps that correspond to when the audio data and the additional audio data were received, respectively. Moreover, the additional audio data can be considered to temporally correspond to the audio data if the timestamps match or are within a threshold duration of time of each other (e.g., within several milliseconds, several seconds, or any other suitable duration of time).

At block 556, the system determined whether the additional assistant device detected the additional audio data that temporally corresponds to the audio data detected at the assistant device. If, at an iteration of block 556, the system determines there is no additional audio data that temporally corresponds to the audio data detected at the assistant device, then the system proceeds to block 566 and discards the audio data and the additional audio data without any further processing. If, at an iteration of block 556, the system determines that there is additional audio data that temporally corresponds to the audio data detected at the assistant device, then the system proceeds to block 558. Put another way, if no other assistant device that should have detected audio data capturing the acoustic event captured any temporally corresponding audio data, then the system may determine that the acoustic event is not an actual acoustic event without processing the audio data using any event detection model(s).

At block 558, the system processes, using an event detection model that is stored locally at the assistant device, the audio data that captures the acoustic event to generate a measure associated with the acoustic event. In some implementations, the audio data that captures the acoustic event can be processed, using a hotword detection model stored locally at the assistant device, to generate a measure that is indicative of whether the audio data detected at the assistant device includes the particular word or phrase (e.g., to activate one or more components of an automated assistant). In some additional or alternative implementations, the audio data that captures the acoustic event can be processed, using a sound detection model stored locally at the assistant device, to generate a measure that is indicative of whether the audio data detected at the assistant device includes the particular sound (e.g., glass breaking, a dog barking, a cat meowing, a doorbell ringing, a smoke alarm sounding, a carbon monoxide detector sounding, a baby crying, knocking on a door, and/or any other sounds that may occur in the ecosystem).

At block 560, the system processes, using an additional event detection model that is stored locally at the additional assistant device, the additional audio data that captures the acoustic event to generate an additional measure associated with the acoustic event. In some implementations, the additional audio data that captures the acoustic event can be processed, using an additional hotword detection model stored locally at the additional assistant device, to generate an additional measure that is indicative of whether the additional audio data detected at the additional assistant device includes the particular word or phrase (e.g., to activate one or more components of an automated assistant). In some additional or alternative implementations, the additional audio data that captures the acoustic event can be processed, using an additional sound detection model stored locally at the additional assistant device, to generate an additional measure that is indicative of whether the additional audio data detected at the additional assistant device includes the particular sound (e.g., glass breaking, a dog barking, a cat meowing, a doorbell ringing, a smoke alarm sounding, a carbon monoxide detector sounding, and/or any other sounds that may occur in the ecosystem).

At block 562, the system processes both the measure and the additional measure to determine whether the acoustic event detected by at least both the assistant device and the additional assistant device is an actual acoustic event. The measure and the additional measure can be, for example, a binary value that is indicative of whether the audio data captures the acoustic event (e.g., "1" for yes and "0" for no), a probability that is associated with whether the acoustic event occurred (e.g., 0.7 that the audio data captures the acoustic event vs. 0.3 that the audio data does not capture the acoustic event), and/or other measures associated with the acoustic event.

At block 564, the system determines whether the acoustic event is an actual acoustic event based on processing the measure and the additional measure at block 562. If, at an iteration of block 564, the system determines the acoustic event is not the actual acoustic event, then the system proceeds to block 566 and discards the audio data and the additional audio data without any further processing. The system then returns to block 552. For instance, assume the measure and the additional measure correspond to a probability that the audio data and the additional audio data capture a hotword, respectively. For example, assume that the measure is a probability of 0.7 that the audio data captures the hotword and assume that the additional measure is a probability of 0.3 that the additional audio data captures the hotword. In this example, the system may determine that the acoustic event is an actual acoustic event (e.g., the user did provide a spoken utterance that includes the hotword) assuming that the probability of 0.7 satisfies a threshold probability level based solely on the measure. However, the system may determine that the acoustic event is not an actual acoustic event (e.g., the user did not provide a spoken utterance that includes the hotword) assuming that the probability of 0.3 fails to satisfy the threshold probability level based on the additional measure. As a result, the system may determine that the acoustic event is not an actual acoustic event, even though the measure indicates that the acoustic event was an actual acoustic event, since the additional measure should also indicate that the acoustic event was an actual acoustic event, and the audio data and the additional audio data can be discarded. Additionally or alternatively, the system can determine whether the acoustic event is the actual acoustic event based on statistics associated with the measures, such as one or more of a mean, median, maximum, minimum, or percentile of the measures generated based on the respective audio data detected at the assistant devices can be utilized to determine whether the acoustic event is an actual acoustic event If, at an iteration of block 564, the system determines the acoustic event is the actual acoustic event, then the system proceeds to block 568. For instance, assume the measure and the additional measure correspond to a probability that the audio data and the additional audio data capture a hotword, respectively. For example, assume that the measure is a probability of 0.7 that the audio data captures the hotword and assume that the additional measure is a probability of 0.8 that the additional audio data captures the hotword. In this example, the system may determine that the acoustic event is an actual acoustic event (e.g., the user did provide a spoken utterance that includes the hotword) assuming that the probability of 0.7 and the probability of 0.8 (or one or more statistics based thereon) satisfy a threshold probability level based on the measure and the additional measure, respectively. As a result, the system may determine that the acoustic event is an actual acoustic event since both the measure and the additional measure indicate that the acoustic event was an actual acoustic event.

At block 568, the system causes an action associated with the actual acoustic event to be performed. The system then returns to block 552. The action performed by the system may be based on the actual acoustic event captured in the audio data and the additional audio data. For example, in implementations where the actual acoustic event corresponds to an occurrence of a hotword, the system can activate one or more components or functions of an automated assistant (e.g., speech processing, natural language processing, and/or other components or functions of an automated assistant). As another example, in implementations where the actual acoustic event corresponds to an occurrence of a particular sound, the system can generate a notification that indicates the particular sound was detected in the ecosystem (and optionally identify which assistant devices that detected the particular sound), and can cause the notification to be rendered at a client device of the user that is associated with the ecosystem (e.g., a mobile device of the user, one or more of the assistant devices, and/or any other client device that is associated with the user).

Figure 6:
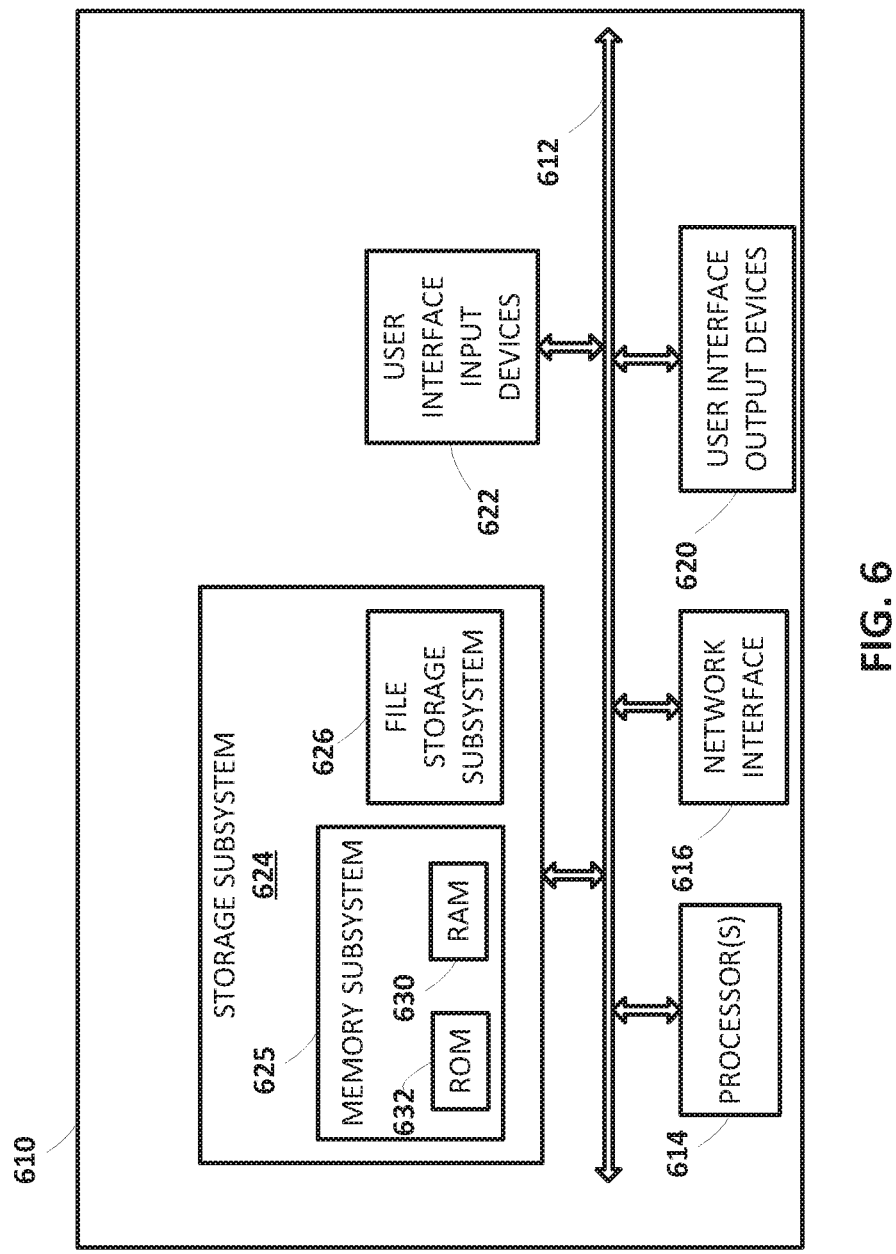
FIG. 6 depicts an example architecture of a computing device, in accordance with various implementations.

FIG. 6 is a block diagram of an example computing device 610 that may optionally be utilized to perform one or more aspects of techniques described herein. In some implementations, one or more of assistant input devices, one or more of cloud-based automated assistant components, one or more assistant non-input systems, one or more assistant non-input devices, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes detecting, via one or more microphones of an assistant device located in an ecosystem that includes a plurality of assistant devices, audio data that captures an acoustic event; processing, using an event detection model that is stored locally at the assistant device, the audio data that captures the acoustic event to generate a measure associated with the acoustic event; detecting, via one or more additional microphones of an additional assistant device located in the ecosystem, additional audio data that also captures the acoustic event, the additional assistant device being in addition to the assistant device, and the additional assistant device being co-located in the ecosystem with the assistant device; processing, using an additional event detection model that is stored locally at the additional assistant device, the additional audio data that captures the acoustic event to generate an additional measure associated with the acoustic event; processing both the measure and the additional measure to determine whether the acoustic event detected by at least both the assistant device and the additional assistant device is an actual acoustic event; and in response to determining that the acoustic event is the actual acoustic event, causing an action associated with the actual acoustic event to be performed.

These and other implementations of the technology disclosed herein can include one or more of the following features.

In some implementations, the acoustic event may include a hotword detection event, the event detection model that is stored locally at the assistant device may be a hotword detection model that is trained to detect whether a particular word or phrase is captured in the audio data, and the additional event detection model that is stored locally at the additional assistant device may be an additional hotword detection model that is trained to detect whether the particular word or phrase is captured in the additional audio data.

In some versions of those implementations, the measure associated with the acoustic event may be a confidence level corresponding to whether the audio data captures the particular word or phrase, and the additional measure associated with the acoustic event may be an additional confidence level corresponding to whether the additional audio data captures the particular word or phrase. In some further versions of those implementations determining that the acoustic event is the actual acoustic event may include determining the particular word or phrase is captured in both the audio data and the additional audio data based on the confidence level and the additional confidence level. In yet further versions of those implementations, causing the action associated with the actual acoustic event to be performed may include activating one or more components of an automated assistant in response to determining the acoustic event data indicates the audio data or the additional audio data captures the particular word or phrase.

In some additional or alternative versions of those implementations, the hotword detection model that is stored locally at the assistant device may be a distinct hotword model that is distinct from the additional hotword detection model that is stored locally at the additional assistant device.

In some implementations, the acoustic event may be a sound detection event, the event detection model that is stored locally at the assistant device may be a sound detection model that is trained to detect whether a particular sound is captured in the audio data, and the additional event detection model that is stored locally at the additional assistant device may be an additional sound detection model that is trained to detect whether the particular sound captured is in the additional audio data.

In some versions of those implementations, the measure associated with the acoustic event may be a confidence level corresponding to whether the audio data captures the particular sound, and the additional measure associated with the acoustic event may be an additional confidence level corresponding to whether the additional audio data captures the particular sound. In some further versions of those implementations, determining that the acoustic event is the actual acoustic event may include determining the particular sound is captured in both the audio data and the additional audio data based on the confidence level and the additional confidence level. In yet further versions of those implementations, causing the action associated with the actual acoustic event to be performed may include generating a notification that indicates an occurrence of the actual acoustic event; and causing the notification to be presented to a user that is associated with the ecosystem via a computing device of the user.

In some additional or alternative versions of those implementations, the particular sound may include one or more of: glass breaking, a dog barking, a cat meowing, a doorbell ringing, a smoke alarm sounding, a carbon monoxide detector sounding, a baby crying, or a door knocking.

In some implementations, processing both the measure and the additional measure to determine whether the acoustic event detected by both the assistant device and the additional assistant device is the actual acoustic event is by a given assistant device, the given assistant device may be one or more of: the assistant device, the additional assistant device, or a further additional assistant device that is co-located in the ecosystem with the assistant device and the additional assistant device.

In some implementations, the method may further include transmitting, by the assistant device, and to a remote system, the audio data; and transmitting, by the additional assistant device, and to the remote system, the additional audio data. In these implementations, processing both the measure and the additional measure to determine whether the acoustic event detected by both the assistant device and the additional assistant device is the actual acoustic event may be by the remote system.

In some implementations, the audio data temporally corresponds to the additional audio data. In some versions of those implementations, processing both the measure and the additional measure to determine whether the acoustic event detected by both the assistant device and the additional assistant device is the actual acoustic event may be in response to determining that a timestamp associated with the audio data temporally corresponds to an additional timestamp associated with the additional audio data.

In some implementations, the method may further include, in response to detecting the audio data via the one or more microphones of the assistant device: anticipating detection of the additional audio data via the one or more additional microphones of the additional assistant device based on a plurality of historical acoustic events being detected at both the assistant device and the additional assistant device.

In some implementations, the method may further include detecting, via the one or more microphones of the assistant device, subsequent audio data that captures subsequent acoustic event; processing, using the event detection model, the subsequent audio data that captures the subsequent acoustic event to generate a subsequent measure associated with the subsequent acoustic event; detecting, via one or more further additional microphones of a further additional assistant device located in the ecosystem, additional subsequent audio data that also captures the subsequent acoustic event, the further additional assistant device being in addition to the assistant device, and the further additional assistant device being co-located in the ecosystem with the assistant device; processing, using a further additional event detection model that is stored locally at the further additional assistant device, the additional subsequent audio data that captures the acoustic event to generate an additional subsequent measure associated with the acoustic event; processing both the measure and the additional measure to determine whether the subsequent acoustic event detected by both the assistant device and the further additional assistant device is an actual subsequent acoustic event; and in response to determining that the subsequent acoustic event is the actual subsequent acoustic event, causing a subsequent action associated with the actual subsequent acoustic event to be performed.

In some versions of those implementations, the method may further include, in response to detecting the subsequent audio data via the one or more microphones of the assistant device: anticipating detection of the additional subsequent audio data via the one or more further additional microphones of the further additional assistant device, and without anticipating detection of any audio data via the one or more additional microphones of the additional assistant device, based on an additional plurality of historical acoustic events being detected at both the assistant device and the further additional assistant device.

In some implementations, a method implemented by one or more processors is provided, and includes detecting, via one or more microphones of an assistant device located in an ecosystem that includes a plurality of assistant devices, audio data that captures an acoustic event; identifying, based on a location of the assistant device within the ecosystem, at least one additional assistant device that should have detected, via one or more respective microphones of the at least one additional assistant device in the ecosystem, additional audio data that temporally corresponds to the audio data; in response to determining that the at least one additional assistant device detected the additional audio data that temporally corresponds to the audio data: processing, using an event detection model that is stored locally at the assistant device, the audio data that captures the acoustic event to generate a measure associated with the acoustic event, and processing, using a respective event detection model stored locally at the at least one additional assistant device, the additional audio data that captures the acoustic event to generate an additional measure associated with the acoustic event; determining, based on both the measure and the additional measure, whether the acoustic event detected by both the assistant device and the additional assistant device is an actual acoustic event; and in response to determining that the acoustic event is the actual acoustic event, causing an action associated with the actual acoustic event to be performed.

These and other implementations of the technology disclosed herein can include one or more of the following features.

In some implementations, the method may further include, in response to determining that the at least one additional assistant device did not detect any audio data that temporally corresponds to the audio data, discarding the audio data.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
    detecting, via one or more microphones of an assistant device located in an ecosystem that includes a plurality of assistant devices, audio data that captures an acoustic event, wherein the acoustic event comprises a hotword detection event;
    processing, using an event detection model that is stored locally at the assistant device, the audio data that captures the acoustic event to generate a measure associated with the acoustic event, wherein the event detection model that is stored locally at the assistant device comprises a hotword detection model that is trained to detect whether a particular word or phrase is captured in the audio data;
    in response to detecting the audio data via the one or more microphones of the assistant device:
        anticipating detection of additional audio data via one or more additional microphones of an additional assistant device based on a plurality of historical acoustic events being detected at both the assistant device and the additional assistant device, the additional assistant device being in addition to the assistant device, and the additional assistant device being co-located in the ecosystem with the assistant device;
    detecting, via the one or more additional microphones of the additional assistant device located in the ecosystem, the additional audio data that also captures the acoustic event;
    processing, using an additional event detection model that is stored locally at the additional assistant device, the additional audio data that captures the acoustic event to generate an additional measure associated with the acoustic event, wherein the additional event detection model that is stored locally at the additional assistant device comprises an additional hotword detection model that is trained to detect whether the particular word or phrase is captured in the additional audio data;
    determining, based on the measure satisfying a threshold indicating that the particular word or phrase is captured in the audio data and based on the additional measure satisfying the threshold indicating that the particular word or phrase is captured in the additional audio data, that the acoustic event detected by at least both the assistant device and the additional assistant device corresponds to an occurrence of an actual acoustic event; and
    in response to determining that the acoustic event corresponds to an occurrence of the actual acoustic event, causing one or more components of an automated assistant to be activated at one or more of: the assistant device, the additional assistant device, or a further additional assistant device.

2. The method of claim 1, wherein the measure associated with the acoustic event comprises a corresponding confidence level corresponding to whether the audio data captures the particular word or phrase, and wherein the additional measure associated with the acoustic event comprises a corresponding additional confidence level corresponding to whether the additional audio data captures the particular word or phrase.

3. The method of claim 2, wherein determining that the acoustic event corresponds to the occurrence of the actual acoustic event comprises determining the particular word or phrase is captured in both the audio data and the additional audio data based on the corresponding confidence level and the corresponding additional confidence level satisfying the threshold.

4. The method of claim 1, wherein the hotword detection model that is stored locally at the assistant device is a distinct hotword model that is distinct from the additional hotword detection model that is stored locally at the additional assistant device.

5. The method of claim 1, wherein the assistant device, the additional assistant device, and the further additional client device are co-located in an ecosystem of devices.

6. The method of claim 1, wherein the audio data temporally corresponds to the additional audio data.

7. The method of claim 6, wherein determining that the acoustic event detected by at least both the assistant device and the additional assistant device corresponds to an occurrence of an actual acoustic event based on the measure satisfying the threshold indicating that the particular word or phrase is captured in the audio data and based on the additional measure satisfying the threshold indicating that the particular word or phrase is captured in the audio data is in response to determining that the audio data temporally corresponds to the additional audio data.

8. The method of claim 6, wherein determining that the acoustic event detected by both the assistant device and the additional assistant device corresponds to the occurrence of the actual acoustic event is in response to determining that a timestamp associated with the audio data temporally corresponds to an additional timestamp associated with the additional audio data.

9. The method of claim 1, further comprising:
transmitting, by the assistant device, and to a remote system, the audio data; and
transmitting, by the additional assistant device, and to the remote system, the additional audio data,
wherein determining whether the acoustic event detected by both the assistant device and the additional assistant device corresponds to the occurrence of the actual acoustic event is by the remote system.

10. The method of claim 1, wherein the one or more components of the automated assistant comprise one or more of:
a speech-to-text component; or
a natural language understanding component.

11. A system comprising:
one or more processors; and
memory storing instructions that, when executed, the one or more processors are operable to:
detect, via one or more microphones of an assistant device located in an ecosystem that includes a plurality of assistant devices, audio data that captures an acoustic event, wherein the acoustic event comprises a hotword detection event;
process, using an event detection model that is stored locally at the assistant device, the audio data that captures the acoustic event to generate a measure associated with the acoustic event, wherein the event detection model that is stored locally at the assistant device comprises a hotword detection model that is trained to detect whether a particular word or phrase is captured in the audio data;
in response to detecting the audio data via the one or more microphones of the assistant device:
anticipate detection of additional audio data via one or more additional microphones of an additional assistant device based on a plurality of historical acoustic events being detected at both the assistant device and the additional assistant device, the additional assistant device being in addition to the assistant device, and the additional assistant device being co-located in the ecosystem with the assistant device;
detect, via the one or more additional microphones of the additional assistant device located in the ecosystem, the additional audio data that also captures the acoustic event;
process, using an additional event detection model that is stored locally at the additional assistant device, the additional audio data that captures the acoustic event to generate an additional measure associated with the acoustic event, wherein the additional event detection model that is stored locally at the additional assistant device comprises an additional hotword detection model that is trained to detect whether the particular word or phrase is captured in the additional audio data;
determine, based on the measure satisfying a threshold indicating that the particular word or phrase is captured in the audio data and based on the additional measure satisfying the threshold indicating that the particular word or phrase is captured in the additional audio data, that the acoustic event detected by at least both the assistant device and the additional assistant device corresponds to an occurrence of an actual acoustic event; and
in response to determining that the acoustic event corresponds to an occurrence of the actual acoustic event, cause one or more components of an automated assistant to be activated at one or more of: the assistant device, the additional assistant device, or a further additional assistant device.

12. A non-transitory computer-readable storage medium storing instructions that, when executed, cause one or more processors to perform operations, the operations comprising:
detecting, via one or more microphones of an assistant device located in an ecosystem that includes a plurality of assistant devices, audio data that captures an acoustic event, wherein the acoustic event comprises a hotword detection event;
processing, using an event detection model that is stored locally at the assistant device, the audio data that captures the acoustic event to generate a measure associated with the acoustic event, wherein the event detection model that is stored locally at the assistant device comprises a hotword detection model that is trained to detect whether a particular word or phrase is captured in the audio data;
in response to detecting the audio data via the one or more microphones of the assistant device:
anticipating detection of additional audio data via one or more additional microphones of an additional assistant device based on a plurality of historical acoustic events being detected at both the assistant device and the additional assistant device, the additional assistant device being in addition to the assistant device, and the additional assistant device being co-located in the ecosystem with the assistant device;
detecting, via the one or more additional microphones of the additional assistant device located in the ecosystem, the additional audio data that also captures the acoustic event, the additional assistant device being in addition to the assistant device, and the additional assistant device being co-located in the ecosystem with the assistant device;
processing, using an additional event detection model that is stored locally at the additional assistant device, the additional audio data that captures the acoustic event to generate an additional measure associated with the acoustic event, wherein the additional event detection model that is stored locally at the additional assistant device comprises an additional hotword detection model that is trained to detect whether the particular word or phrase is captured in the additional audio data;

determining, based on the measure satisfying a threshold indicating that the particular word or phrase is captured in the audio data and based on the additional measure satisfying the threshold indicating that the particular word or phrase is captured in the additional audio data, that the acoustic event detected by at least both the assistant device and the additional assistant device corresponds to an occurrence of an actual acoustic event; and in response to determining that the acoustic event corresponds to an occurrence of the actual acoustic event, causing one or more components of an automated assistant to be activated at one or more of: the assistant device, the additional assistant device, or a further additional assistant device.

13. The system of claim 11, wherein the measure associated with the acoustic event comprises a corresponding confidence level corresponding to whether the audio data captures the particular word or phrase, and wherein the additional measure associated with the acoustic event comprises a corresponding additional confidence level corresponding to whether the additional audio data captures the particular word or phrase, and wherein determining that the acoustic event corresponds to the occurrence of the actual acoustic event comprises determining the particular word or phrase is captured in both the audio data and the additional audio data based on the corresponding confidence level and the corresponding additional confidence level satisfying the threshold.

14. The system of claim 11, wherein the hotword detection model that is stored locally at the assistant device is a distinct hotword model that is distinct from the additional hotword detection model that is stored locally at the additional assistant device.

15. The system of claim 11, wherein the assistant device, the additional assistant device, and the further additional client device are co-located in an ecosystem of devices.

16. The system of claim 11, wherein the audio data temporally corresponds to the additional audio data, and wherein determining that the acoustic event detected by at least both the assistant device and the additional assistant device corresponds to an occurrence of an actual acoustic event based on the measure satisfying the threshold indicating that the particular word or phrase is captured in the audio data and based on the additional measure satisfying the threshold indicating that the particular word or phrase is captured in the audio data is in response to determining that the audio data temporally corresponds to the additional audio data.

17. The system of claim 11, wherein the audio data temporally corresponds to the additional audio data, and wherein determining that the acoustic event detected by both the assistant device and the additional assistant device corresponds to the occurrence of the actual acoustic event is in response to determining that a timestamp associated with the audio data temporally corresponds to an additional timestamp associated with the additional audio data.

18. The system of claim 11, wherein the one or more processors are further operable to:

transmit, by the assistant device, and to a remote system, the audio data; and transmit, by the additional assistant device, and to the remote system, the additional audio data, wherein determining that the acoustic event detected by both the assistant device and the additional assistant device corresponds to the occurrence of the actual acoustic event is by the remote system.

* * * * *